Aug. 5, 1958 C. STRACHEY ET AL 2,846,142

ELECTRONIC DIGITAL COMPUTING ENGINES

Filed Aug. 25, 1954 15 Sheets-Sheet 1

INVENTORS:
C. STRACHEY
D. B. GILLIES
By Stevens, Davis, Miller & Mosher

ELECTRONIC DIGITAL COMPUTING ENGINES

Filed Aug. 25, 1954 15 Sheets-Sheet 2

INVENTORS:
CHRISTOPHER STRACHEY
DONALD B. GILLIES

By Stevens, Davis, Miller & Mosher
Attorneys

Aug. 5, 1958 C. STRACHEY ET AL 2,846,142

ELECTRONIC DIGITAL COMPUTING ENGINES

Filed Aug. 25, 1954 15 Sheets-Sheet 3

INVENTORS:
CHRISTOPHER STRACHEY
DONALD B. GILLIES

By Stevens, Davis, Miller + Mosher

Attorneys

INVENTORS:
C. STRACHEY
D. B. GILLIES

INVENTORS:
C. STRACHEY
D. P. GILLIES
By Stevens, Davis, Miller & Mosher

INVENTORS:
CHRISTOPHER STRACHEY
DONALD B. GILLIES

By Stevens, Davis, Miller & Mosher
Attorneys

INVENTORS:
CHRISTOPHER STRACHEY
DONALD B. GILLIES
By Stevens Davis Miller & Mosher
Attorneys Aug. 5, 1958 C. STRACHEY ET AL 2,846,142

ELECTRONIC DIGITAL COMPUTING ENGINES

Filed Aug. 25, 1954 15 Sheets-Sheet 8

INVENTORS:
CHRISTOPHER STRACHEY
DONALD B. GILLIES

By Stevens Davis Miller & Mosher

Attorneys

Aug. 5, 1958 C. STRACHEY ET AL 2,846,142

ELECTRONIC DIGITAL COMPUTING ENGINES

Filed Aug. 25, 1954 15 Sheets-Sheet 9

INVENTORS:
CHRISTOPHER STRACHEY
DONALD B. GILLIES

By Stevens, Davis, Miller + Mosher

Attorneys

Inventors:
C. STRACHEY
D. B. GILLIES

Aug. 5, 1958 C. STRACHEY ET AL 2,846,142

ELECTRONIC DIGITAL COMPUTING ENGINES

Filed Aug. 25, 1954 15 Sheets-Sheet 11

INVENTORS:
CHRISTOPHER STRACHEY
DONALD B. GILLIES

By Stevens Davis Miller & Mosher

Attorneys

INVENTORS:
C. STRACHEY
D.B. GILLIES

Inventors:
Christopher Strachey
Donald Bruce Gillies
By: Stevens, Davis, Miller & Mosher
Attorneys

Aug. 5, 1958 C. STRACHEY ET AL 2,846,142

ELECTRONIC DIGITAL COMPUTING ENGINES

Filed Aug. 25, 1954 15 Sheets-Sheet 14

Inventors:
Christopher Strachey
Donald Bruce Gillies
By: Stevens, Davis, Miller & Mosher
Attorneys Inventors:
Christopher Strachey
Donald Bruce Gillies
By: Stevens, Davis, Miller & Mosher
Attorneys United States Patent Office 2,846,142
Patented Aug. 5, 1958

2,846,142

ELECTRONIC DIGITAL COMPUTING ENGINES

Christopher Strachey, London, England, and Donald Bruce Gillies, Toronto, Ontario, Canada, assignors to National Research Development Corporation, London, England, a British corporation Application August 25, 1954, Serial No. 452,026

Claims priority, application Great Britain August 27, 1953

10 Claims. (Cl. 235—61)

The present invention relates to electronic digital computing machines. In the specifications of copending patent applications Nos. 418,104, 418,105 and 418,129 there is described a computing machine in which information is stored in delay lines in dynamic, serial form in some parts of the machine and in the form of magnetic recordings on a rotating disc, which forms the main information store of the machine. The present invention is primarily concerned with apparatus for performing the function of multiplication and will be described in relation to the machine to which the above mentioned patent applications relate, as constituting a modified form of part of the arithmetic organ of that machine. It will be understood, however, that the present invention may be applied to other types of machine.

In performing the process of multiplication, as is well-known, the multiplication of two numbers results in a product having twice as many digits as either of the original numbers so that if, as is normally the case, the storage facilities of a machine comprise registers each adapted to accommodate the digits of a single so-called "word" it is necessary to combine two such registers or provide a special double-length register to accommodate the double-length word resulting from a multiplication. In the machine above referred to multiplication is effected using two single word registers in tandem for the product of a multiplication; the multiplication process consists in performing a series of additions in which the multiplicand, shifted by the appropriate number of digit positions is added to itself (or an existing partial product) or not according to whether or not the multiplier contains "1" in the relevant digit position and this process is achieved by circulating the multiplicand (or the partial product) through the two registers in series, effecting a shift of one digit position at each circulation, the multiplicand being added in at the appropriate time in the circulation cycle under control of the multiplier. Initially the multiplier may be stored in one of the series-connected registers, it being "lost" digit-by-digit as the multiplication proceeds, the digits of the multiplier being discarded as they are used and the storage space thus liberated being employed to accommodate the growing partial product. It will be appreciated that with such an arrangement the double-length register formed by the two word-length registers in series will require two word times for each circulation of its contents.

One object of the present invention is to provide an arrangement which will enable the process of multiplication to be carried out more rapidly in such a machine.

According to this invention in one aspect therefore an arrangement is provided for effecting multiplication in an electronic digital computer comprising circulating delay line storage registers, the multiplying arrangement comprising three such registers each of one word length and each provided with its own circulation loop, an adding circuit connected in the circulation loop of one of said registers (accumulator register) a gate circuit connected between another of said registers (multiplicand register) and said adding circuit means for controlling said gate circuit said means comprising a control circuit connected between the third of said registers (multiplier register) and said gate circuit and a transfer circuit connected between said accumulator register and said multiplier register for transferring digit signals from said accumulator to said multiplier register. Said accumulator and multiplier registers are preferably of different length from the multiplicand register by one digit time, whereby the numbers circulating in them are shifted by one digit with respect to the number in the multiplicand register for each circulation of the registers.

It will thus be seen that a digit of the multiplier will be employed at each word time to set up said control circuit and will control (by whether it is a "0" or a "1") whether or not the multiplicand is fed through the adding gate into the accumulator register and added to the contents thereof. Each such addition will take place with a shift relative to the contents of the accumulator register appropriate to the significance of the multiplier digit which caused the addition to be made, as is required for the multiplication process. The contents of the accumulator register is, therefore, the partial product, which will grow digit-by-digit as the multiplier digits are used up and these additional digits will be transferred to the multiplier register by the transfer gate to refill the digit intervals vacated by the multiplier digits which have been used. These transferred digits will be circulated with the multiplier digits. When the multiplication is complete the double-length word representing the product will thus be contained as to one half in the accumulator register (in general the most significant half) and as to the other half in the multipler register where it replaces the multiplier.

It will be appreciated that by using an arrangement as above described, each stage of the multiplication occupies only one word time as against two word times in the known arrangements above mentioned.

The above discussion does not take account of the sign of the numbers being multiplied or of the product. In binary arithmetic as practised in machines of the kind to which this invention relates, the sign of a number is indicated by the digit in the position of greatest significance. This digit is a "0" for positive numbers or a "1" for negative numbers. The logic of this arrangement derives from the convention that all the numbers manipulated in the machine are regarded as lying between +1 and −1. It follows that if we subtract 2 from a positive number which is less than 1 a negative resultant is obtained and the presence of a "1" in the digit position of greatest significance indicates that this subtraction must be made and a negative number is thus implied. In the process of multiplication the significance of a "1" in the "sign digit" position of the multiplier is that the last operation must be the subtraction of the multiplicand from the partial product in the position of greatest significance instead of addition as in the previous stages.

The present invention has for a further object the provision of means for complying with this requirement.

According to the invention in this aspect there is provided a multiplier for electronic digital computing machines in which instruction words contain two addresses related to information stored in a storage facility of the machine, and in which the machine is invested with one operative condition while searching for one of said addresses in an instruction word and with a different operative condition while searching for the other of said addresses, said multiplier including a gate circuit adapted to effect addition of a multiplicand to a partial product in the normal process of multiplication and being adapted to be converted to perform the function of subtraction, it being arranged that the last digit of the multiplier word becomes effective when the second of said addresses is found and the consequent changeover of the machine from its one operative condition to the other is effective to convert said gate circuit from its adding condition to its subtracting condition.

It follows that in this aspect of the invention the last word time occupied by the multiplication can be made to overlap the reading of the next order out of the information store, identified by the second address, whereby a further economy of time may be effected.

The invention will be more clearly understood from the following description given with reference to the accompanying drawings which relate to a machine similar to that described in the above mentioned patent applications but with some modifications. In the drawings.

Figures 10*a*, 10*b*, 10*c* and 10*d* show details of the arithmetical organ of the machine.

Figure 11:
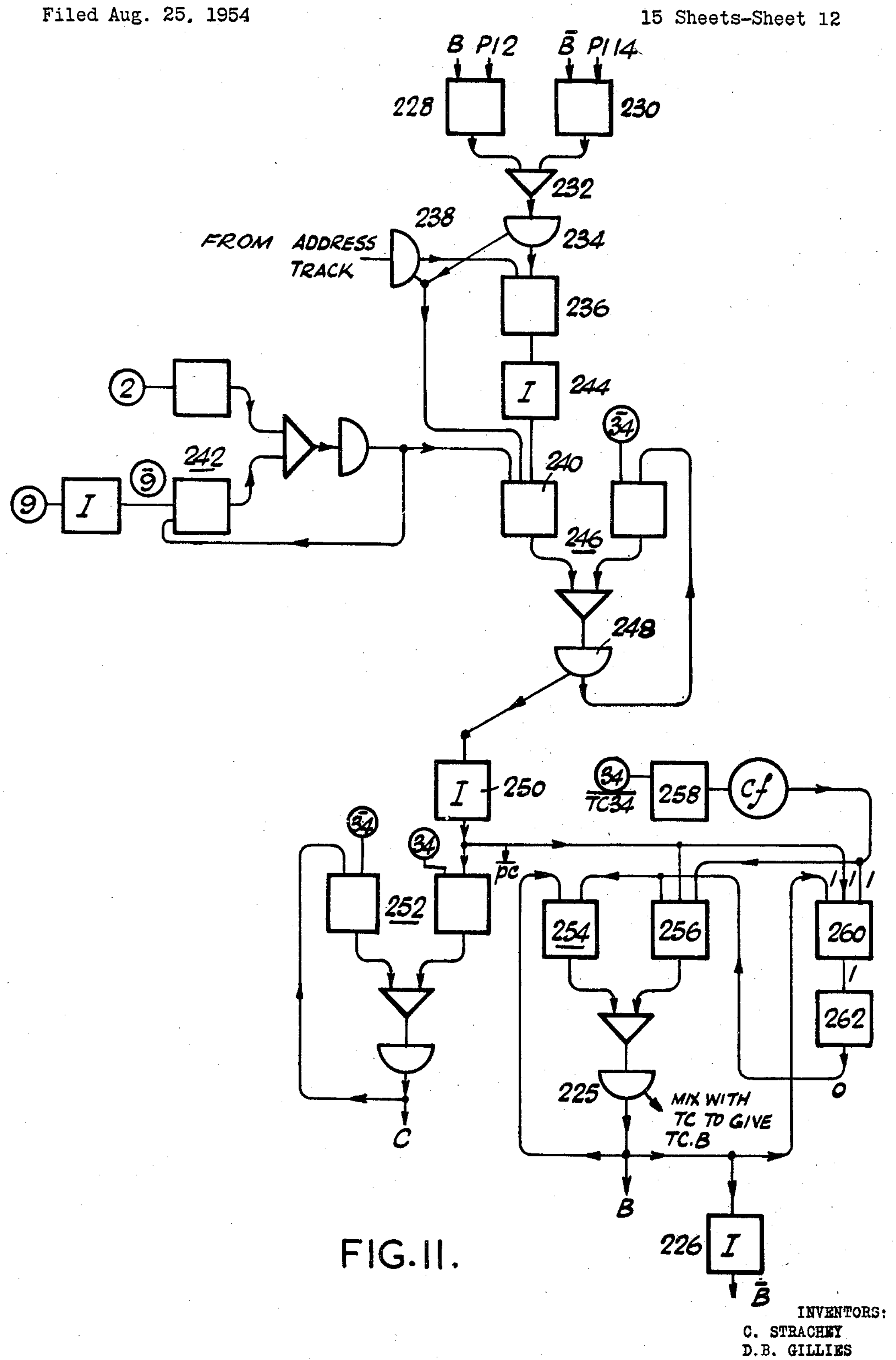

Figure 11 shows details of part of the control unit of the machine.

Figure 12:
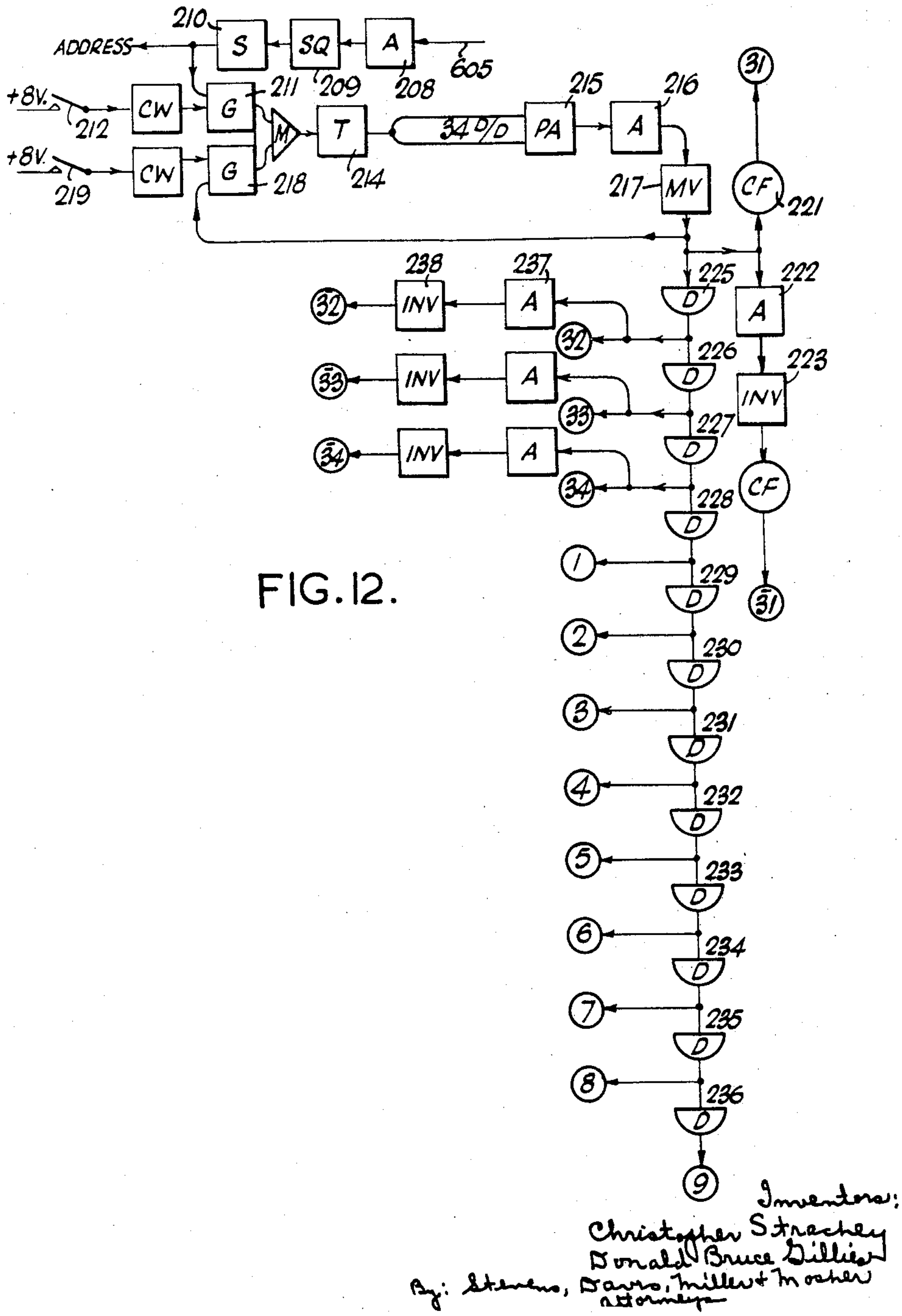

Fig. 12 shows details of part of the pulse generator of the machine.

Figure 13:
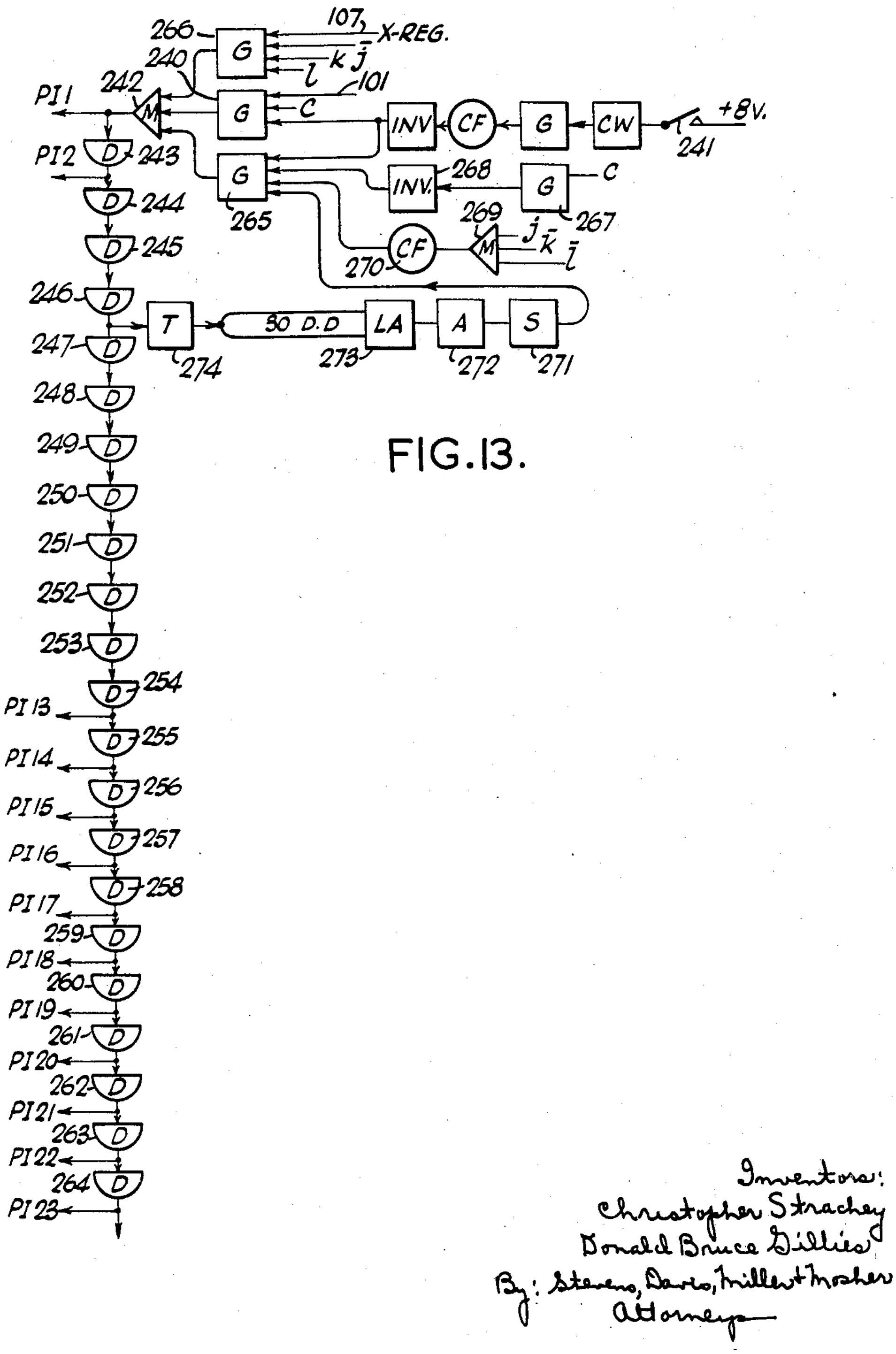

Fig. 13 shows details of the delay chain of the machine.

Figure 14:
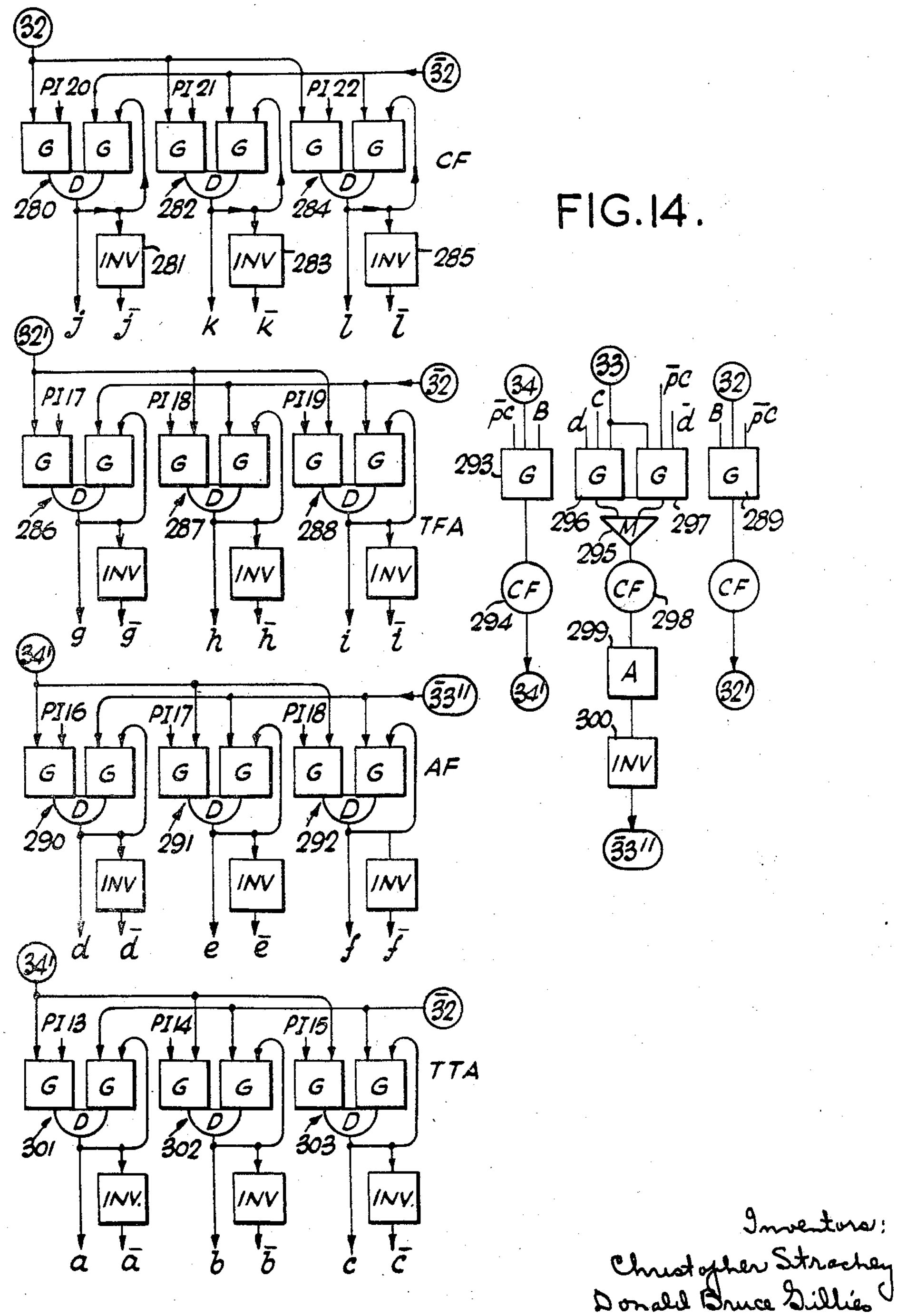

Fig. 14 shows details of the instruction staticisors of the machine.

Figure 1:
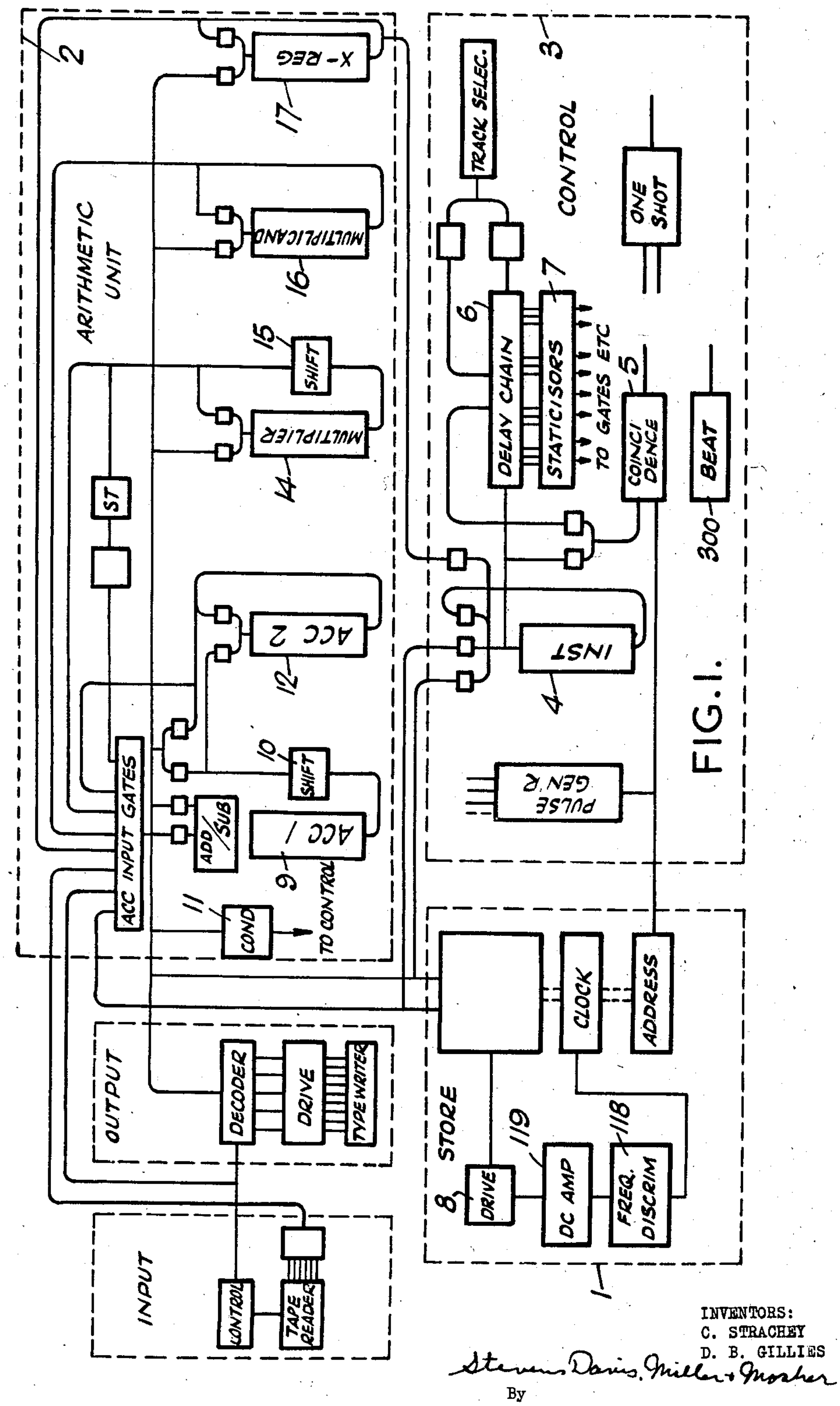
Figure 1 shows a block diagram of the complete machine.

In Figure 1, 1 is the main store of the machine. This comprises a 9" diameter disc having a coating of magnetisable material and arranged to be driven at a controlled speed of 4,500 R. P. M. The inter-digit period of the machine is 3 microseconds and the store holds 1,024 words each of 32 digits and a gap of 2 digit periods. The words are divided between eight radially spaced tracks on the disc giving 128 words in each track.

A 1,024 word store needs 10 binary digits to define each address, and since the instruction words each contain two addresses (i. e. 20 digits) 12 digits are availale to define the function of the instruction. The function code of the instruction word is broken down into four groups, each of three digits. These four three-digit groups are conveniently decoded by the standard units of which the machine is bulit.

Strictly speaking the machine does not make the most efficient use of the 12 function digits because not all the possible combinations of the groups are useful. However, all the conventional types of instructions are covered, as stated above. Keeping sub-order groups to a maximum of three digits fits in with the standard logical circuits and also makes servicing of the machine a much simpler matter because each group of digits controls a comparatively small number of gates.

The form of the instruction word used in the machine is as follows:

| | |
|---|---|
| First address | digits 1 to 10 |
| Transfer to accumulator | digits 20 to 22 |
| Accumulator function | digits 17 to 19 |
| Transfer from accumulator | digits 14 to 16 |
| Control functions | digits 11 to 13 |
| Second address digits | digits 23 to 32 |
| Gap | digits 33 and 34 |

The component parts of this instruction word will be more specifically described below when the method of operation of the control unit of the machine is described.

The drive motor 8 for the store 1 is controlled by clock pulses stored on the disc or on a phonic wheel. These pulses are fed to a frequency discriminator 118 which gives a direct current output the magnitude of which depends on the frequency of the clock pulses which in turn, of course, depends on the speed of rotation of the disc. This direct current is magnified in the direct-current amplifier 119 and is applied to the field windings of the drive motor 8 to control its speed. The frequency discriminator 118 may be of any suitable type; we prefer to use the well known Foster-Seeley circuit described for example in Terman's "Radio Engineers Handbook."

Words from the store 1 pass to and from the arithmetical organ 2 and to the control circuit 3. The control circuit 3 can also be fed with a word stored in a register in the arithmetical organ.

The disc has recorded on it address signals in the binary scale of notation arranged so that a particular address signal is read out during digit times 2 to 8 inclusive in the word time immediately before the time at which the word stored in the address specified by the number is available at the reading head. For example, at the time when the word in the address 7 could have been read out the address signal 8 (0001000) is read out. The control circuit looks for coincidence between the address signals coming from the disc and address codes in the instruction word. When coincidence is obtained the next occurring word (i. e. the word in the address specified by the address signal) may be read into or out of the store.

In the control unit 3 is the coincidence unit 5 which looks for coincidence between address signals coming from the store and the coded addresses in the instruction word. When coincidence is obtained outputs are given by the coincidence circuit to control gates in a manner which will be more particularly described below. The coincidence circuit 5 may compare the address signals first with the first address in the instruction word and then with the second address; alternatively it may compare the address signals only with the first address. This comparison depends on the state of a beat circuit 300, the nature of which will also be more particularly described below.

The arithmetical unit or organ 2 contains five word-length registers. Firstly, an accumulator register 9 having the usual input facilities of add, subtract, collate etc. and in its circulation path a shift 10 which may work either way, i. e. delay or advance. Secondly, a register 12 which may be switched to form part of the circulation of the accumulator 9; e. g. to accommodate a double-length word arising from multiplication. Thirdly, a register 14 to contain a multiplier and having a controllable shift 15 in its circulation. Fourthly, a register 16 to hold a multiplicand and fifthly a register 17, called the X register. The output from the accumulator also goes to the conditional order selector 11, the function of which has yet to be described. In the process of multiplication, as practised in accordance with the present invention, only the three registers 9, 14 and 16 are used and therefore only these three registers will be considered in the description below.

When the organ 2 is not multiplying, the registers 14, 16 and 17 can be used as immediate access stores. When the organ 2 is multiplying, only register 17 can be used in this way.

Figure 2A:
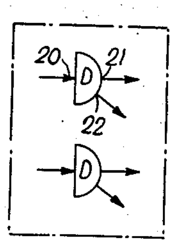
Figures 2A, 2B, 3A, 3B, 3C and 4 show standard units of which the machine is built.
Figure 2B:
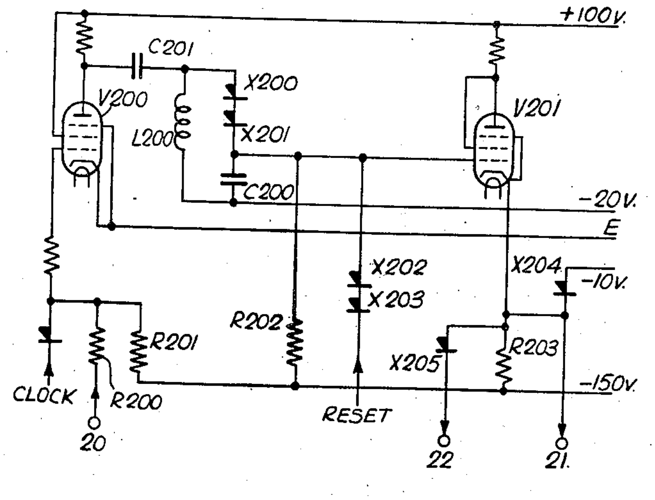
Figure 3B:
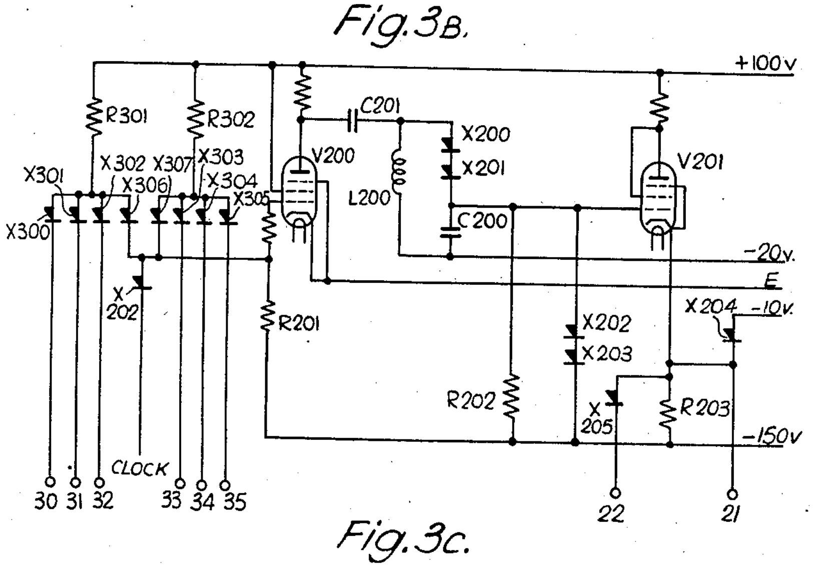
Figure 3C:
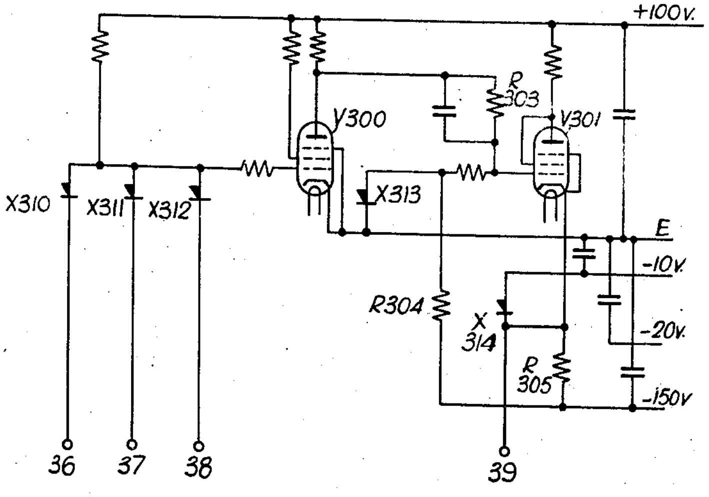
Figure 3A:
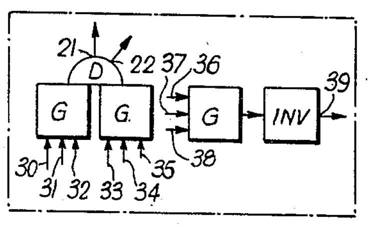
Figure 5:
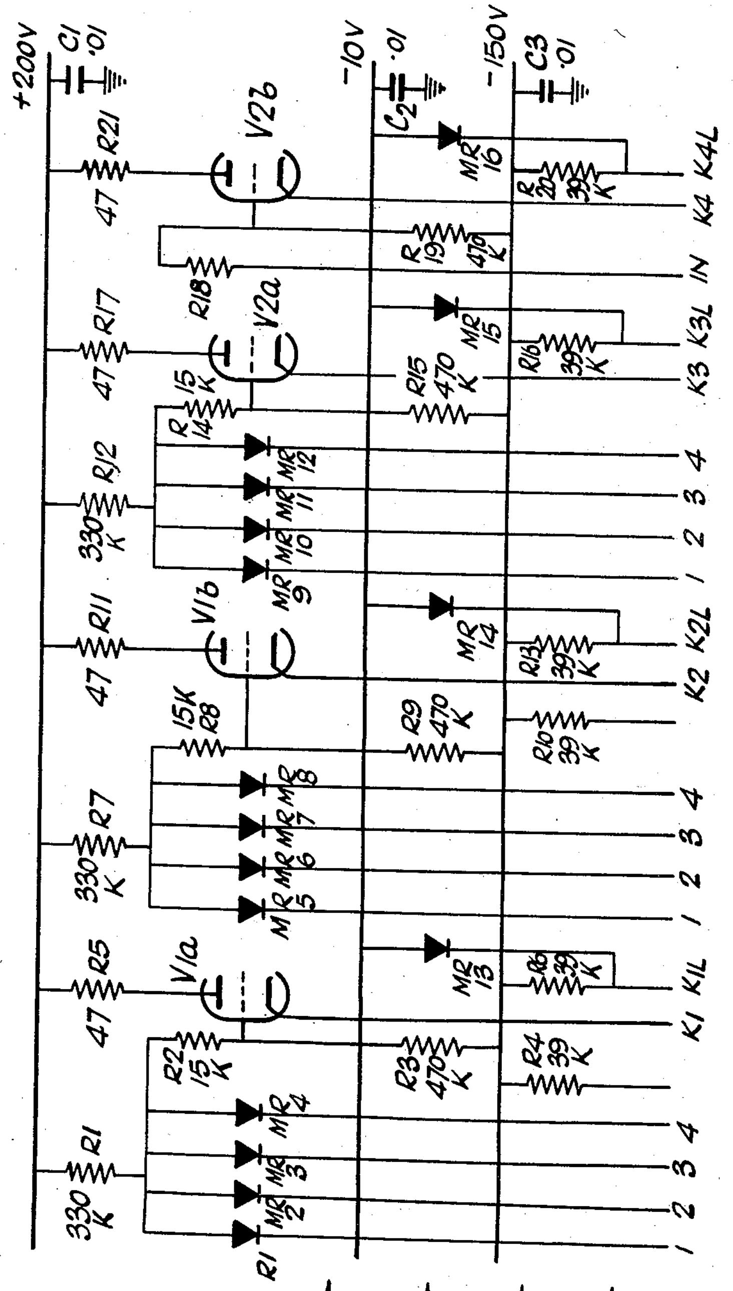
Figure 5 shows details of the unit shown in Fig. 4.
Figure 4:
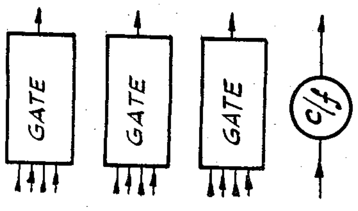

As stated above, the machine is made up of a large number of discrete units of the three types described in the specification of copending patent application No. 394,442, now abandoned. These units are shown in Figures 2, 3 and 4 and they comprise, firstly unit delays, the symbol and the detailed circuit for which are shown in Figures 2A and 2B respectively; secondly a unit delay fed with the mixed outputs from two gates, and an inverter fed with the output from a gate, shown in Figures 3A, 3B and 3C; and thirdly, a unit having three gates and a separate cathode follower, the symbol for which is shown in Figure 4. The circuit of the unit shown in Figure 4 is given in detail in Figure 5 of the accompanying drawings, which shows how the unit may be made up as a standard form of plug-in unit using commercial plugs and sockets so that it may be plugged into a standardised rack; this arrangement makes servicing of the machine a comparatively simple matter.

These circuits have considerable advantages, for example the delay circuits give output pulses accurately timed and reshaped. The unit of the kind shown in Figure 3 can be used to form a trigger circuit or one digit staticisor as described later in conjunction with Figure 14 and in this case if these particular circuits are used the output from the trigger circuit, when set, is a series of accurately timed pulses of good shape. This kind of output is more useful in the present machine than the steady outputs given by known triggers, e. g. the Eccles-Jordan circuit.

Figure 6:
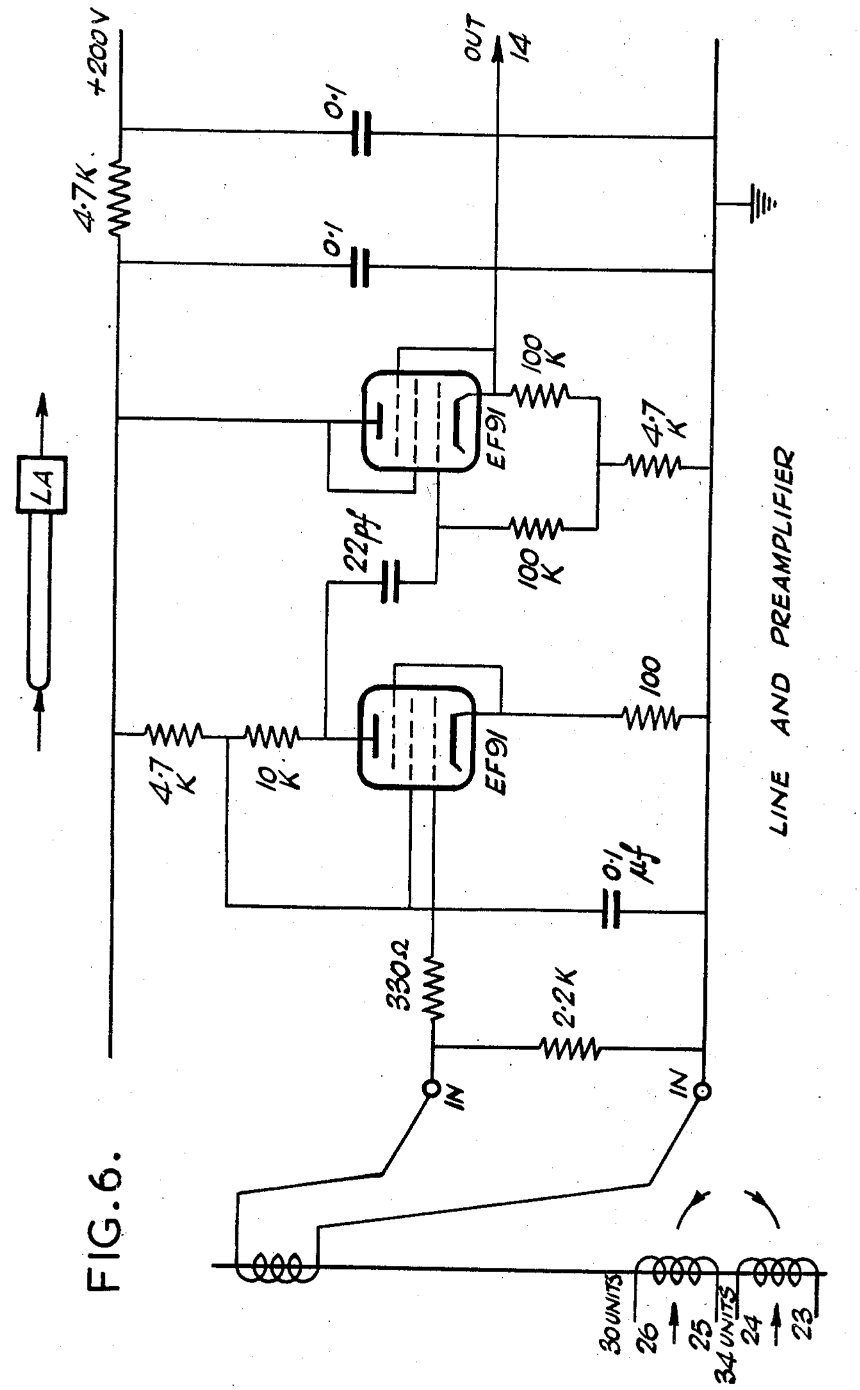
Figures 6, 7 and 8 show details of the units which make up a word-length register.
Figure 7:
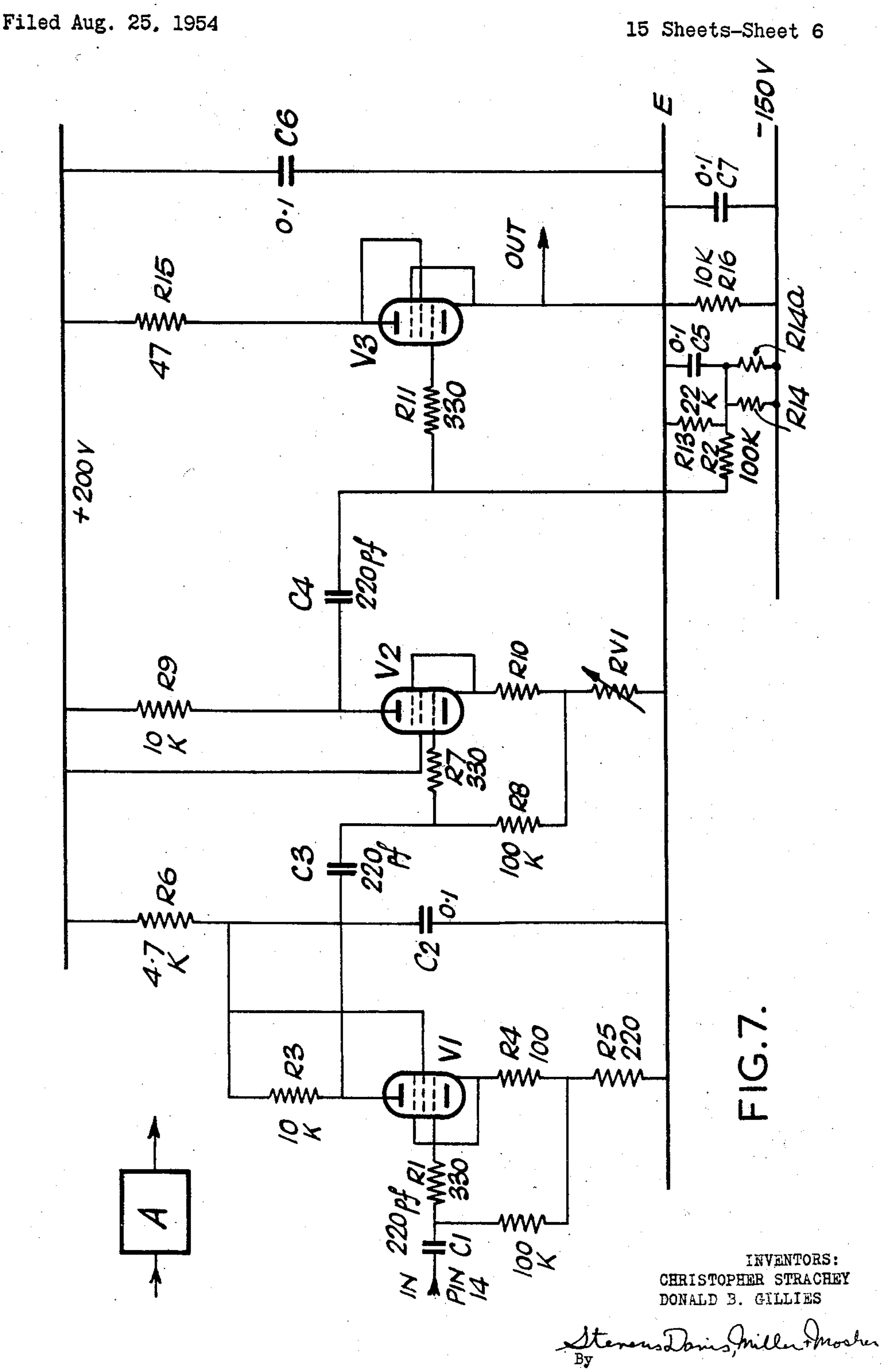
Figure 8:
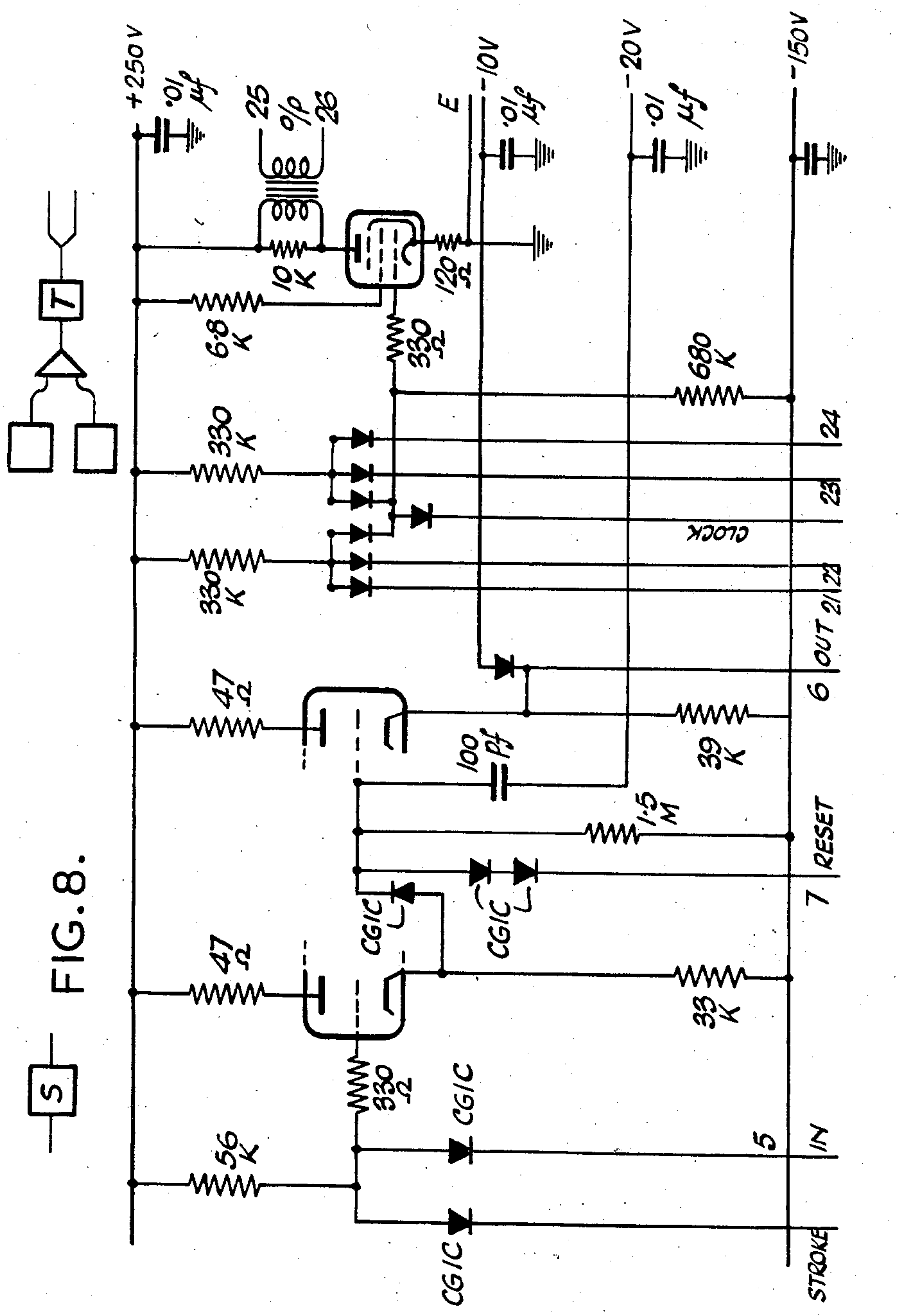

The word-length registers used in the machine include a nickel magnetostriction delay line and the register units are similar in mechanical construction to the units referred to above. Each register comprises, in addition to the nickel delay line, a driver, a regenerator, an amplifier and a pre-amplifier. The nickel line may give 34 or 30 units of delay. When 30 units of delay are given the other four units of delay (to make the 34-digit word time) are obtained from further units of the type shown in Figure 2 or in Figure 3 which are used in combination with the delay line unit to make the complete word-length register, thus a complete register, including the necessary gates, may consist of three plug-in units. The circuits of the delay line units are shown in Figures 6, 7 and 8. Figure 6 shows the line and its pre-amplifier. Figure 7 shows the amplifier which is fed by the output of the pre-amplifier. Figure 8 shows the line driver and reshaper.

The symbols for the different parts of the delay-line units are also shown in Figures 6, 7 and 8. These symbols are used in the detailed circuit diagrams of the arithmetical organ etc.

In conventional manner the machine relies upon a plurality of digit timing pulse waveforms for marking the different digit time periods of the machine operational ryhthm and these each comprise a short duration pulse occurring once during each word time period in a particular digit time thereof. Such waveforms are denoted throughout the drawings by a number within a circle, the number indicating the digit time within which the pulse occurs. Thus, 31 within a circle indicates a pulse during the digit time 31 of each word time, 1 within a circle a pulse during digit time 1 and so on. The indications $\overline{31}$, $\overline{32}$ and so on within circles denote an inverse version wherein the waveform is normally at its operative level and has a pulse to inoperative level during the indicated digit time.

Referring now to Fig. 12 which shows the arrangements for generating the digit time pulses, address signals from the store (1 in Fig. 1) over lead 605 are fed through amplifier 208 and shaper 210 to provide, firstly, a series of so-called address signals indicating the available word position in the store. Such address signals are also applied to gate 211 which is capable of being opened by closure of a manual control switch 212 whereby such address signal is passed to the line driver 214 of a 34-unit delay line and amplifier 215. The output signals from this delay line are applied through amplifier 216 to the triggering unit or control terminal of a conventional free-running multibrator 217. This multivibrator is arranged to have an on-time period of about three-quarters of one word time period, say 25 unit periods, and a natural off-time of more than one word time period, say about three word time periods. The multivibrator is arranged in combination with a suitable pulse shaping circuit so that when it goes on it gives out a single digit pulse. The address signals at the output from the shaper 210 may comprise any permutation of pulses in digit times 2–8 of the word time for defining an address location in the store as already explained. In addition, however, such address signals always comprise a further trigger pulse in each digit position 31. This pulse in digit position 31 will, at least after the first operation, be the pulse which puts the multivibrator 217 on and provides a single digit pulse output from the latter at each 31-digit time of the machine rhythm.

Because the multivibrator 217 has just gone on at digit time 31, it cannot be set on again by any of the next following address pulses but at the end of one word time, that is when the next trigger pulse in digit 31 time appears, the multivibrator has already gone off again and is ready to generate another pulse and does so when the trigger pulse arrives. The normal runing circulation for the delay line 215 is through gate 218 which is normally held open by potential from a normally-closed manual control switch 219.

The pulse output from multivibrator 217 at each 31-digit time is applied through cathode follower 221 to form the 31-pulse waveform and is also fed through amplifier 222 and inverter 223 to provide the 31-pulse waveform.

The same signal pulse output from multivibrator 217 is applied to a series chain of unit delays 225, 226 . . . 236. The one unit delayed output from delay 225, occurring in digit time 32 of each beat, is made directly available as the 32-pulse waveform and is also fed through amplifier 237 and inverter 238 to form the inverse or $\overline{32}$-pulse waveform. Similarly, the further delayed output from unit delay 226 is made available as the 33-pulse waveform and, through an amplifier and inverter, the $\overline{33}$-pulse waveform. Again in similar manner, the further delayed output from unit delay 227 is made available as the 34-pulse waveform and, after passage through an amplifier and inverter, as the $\overline{34}$-pulse waveform. In generally similar manner, the output from unit delay 228 provides the 1-pulse waveform, the further delayed output from delay 229 provides the 2-pulse waveform and so on, the output from the final unit delay 236 consisting the 9-pulse waveform consisting of a pulse in digit time 9 of each word time. These waveforms are used at various places throughout the machine for timing purposes in the usual way.

Referring now to Fig. 13 which shows the arrangements of the delay chain (6 in Fig. 1), this delay chain comprises a gate 240 having one input supplied by way of lead 101 with output signals derived from the store (1 in Fig. 1). This gate has two further controlling inputs comprising respectively the C signal from trigger circuit 252, Fig. 11, and a potential derived from a start switch 241. For the moment it will be assumed that all of these control potentials are such that gate 240 is open to allow the store output signal on lead 101 to pass therethrough. The output from gate 240 is applied by way of mixer 242 to a chain of 22 unit delays 243, 244 . . . 264. An output is taken from the output side of mixer 242 to constitute a signal known as the PI1 signal. The output from unit delay 243 is similarly made available as the PI2 signal while the outputs from the later unit delays 254 . . . 264 are each made available externally as the PI13 . . . PI23 outputs. These outputs, which are at respectively different timings, are used in a manner which will be described later with reference to Fig. 14, to control the operation of the staticisors and the beat circuit of the machine as well as certain other elements which, as they are of no concern in the present invention, are neither shown or described. Details of such other elements can, however, be obtained from the aforesaid copending applications.

The delay chain arrangements include further gates 265, 266 whose outputs are also applied to the mixer 242. The controlling inputs for gate 265 comprise respectively the output from gate 267 through inverter 268, the output from mixer 269 through cathode follower 270, the potential provided by start switch 241 already referred to and the output from shaper 271 of a 34-unit delay line made up of amplifier 272, line amplifier 273, driver 274 and the four unit delays 243 . . . 246. The line element of 273 is itself of only 30-unit delay time. The circulation loop of the line is completed through mixer 242 and gate 265 to constitute what is known as the instruction register (4 in Fig. 1). It is in this register that an instruction word continues to circulate after its initial introduction until the operations concerned in the particular instruction have been completed.

The gate 266 is controlled by the $\bar{j}$, $k$ and $l$ outputs of the staticisor group CF, Fig. 14, and yet to be described and controls a supply to mixer 242 of the output on lead 107 from the X register (17 in Fig. 1) of the arithmetic unit.

The detailed operation of the various control gates 240, 265 and 266 of the delay chain need not be referred to here in detail as their manner of operation is not closely concerned with the present invention. Full details of such operation can, however, be obtained from the aforesaid copending applications. It is sufficient for the purposes of the present application to appreciate that an instruction word signal fed into the delay chain of unit delays 243 . . . 254 over lead 101 or lead 107, passes therethrough and becomes available at the different output points thereon at progressively later time instants, relative to its original input timing and the standard machine timing. The delay of each output is in accordance with the number of unit delays which exist between the input point and the particular output point chosen. Furthermore, under certain operating conditions, such inserted instruction word signal can be inserted into the instruction word register including the line 273 and thereafter re-presented to the delay chain once in each beat interval unitl it is subsequently erased from the register by closing the gate 265.

The machine also includes means in the form of staticisors for providing sustained control potentials each representative of the significance of a particular one of the 12 function digits of each order as already briefly referred to. These various staticisor devices are shown in Fig. 14 and are sub-divided into four groups each dealing with three function digits corresponding respectively to the four three-digit groups already referred to.

Each of the staticisor sections which deal with an individual digit of the instruction word comprises a trigger circuit arrangement utilising a combined two gate and unit delay device as described with reference to Fig. 3. Broadly, such trigger circuit is constructed by feeding back the output of the unit delay to one controlling input of one of the two gates, the other controlling input of which gate is supplied normally with a gate opening potential and with a gate closing potential immediately preceding the digit period when the output from the trigger is required to cease. The opposite one of the two gates is supplied at one of its two controlling inputs with the pulse waveform from which it is desired to staticise a selected single digit signal and at its other input with a gate opening pulse timed to coincide with the digit time of the particular digit signal which is to be staticised.

In the operation of such a circuit the second-mentioned gate, being opened at the correct time instant, either allows a pulse to pass therethrough from the input signal train if the value of the selected digit signal is "1" or provides no input at all if the digit signal is value "0." If the digit value is "1" then a pulse passed through the gate and through the subsequent unit delay emerges from the latter and is returned to re-enter the first-mentioned gate, thereby again passing through the delay in the following digit time and thereafter continuously circulating around the closed loop until the first-mentioned gate is momentarily closed by the applied gate-closing pulse whereupon the circulation ceases. The output from the unit delay is used as the equivalent of the normal static or staticised control potential obtained from the conventional trigger circuit type of staticisor and is in the form of a repeated series of digit pulses, one at each digit time of the time interval between the instant of initiation and the subsequent instant of termination of trigger operation. Such output is made available in its normal and also in its inverse form.

Referring now in detail to Fig. 14, the staticisor group CF is arranged to deal with the control function digits 11–13 of each instruction word. This group comprises a first trigger circuit 280 in which the output from the unit delay is fed back to one input of the right-hand gate element, the other input of which is supplied with the 32-pulse waveform from the timing pulse generator of Fig. 12. The left-hand gate of the trigger is supplied with the $\overline{32}$-pulse waveform from the same generator, Fig. 12, at one of its inputs and with the PI20 output signal from the delay chain of Fig. 13 at its other input. The output from the unit delay provides the $j$ signal and this is also applied to an inverter 281 whose output constitutes the inverse or $\bar{j}$ signal.

The instruction word pulse train available as signal PI20 is of such timing that the 13th digit thereof coincides with 32-pulse time of the machine rhythm and consequently, if the aforesaid digit 13 is of value "1," a pulse is fed into the circulating loop and the trigger is set on. The output present as the $\bar{j}$ signal, whilst the trigger is off then ceases until such trigger is set off again.

A similar arrangement comprising the trigger 282 and inverter 283 is supplied with the PI21 output from the delay chain, Fig. 13, to provide a similar pair of staticised outputs dependent on the signalled value of the 12th instruction word digit. These outputs are referred to as the $k$ and $\bar{k}$ signals. A third circuit arrangement comprising trigger 284 and inverter 285 is fed with the PI22 signal from the delay chain, Fig. 13, and provides the $l$ and $\bar{l}$ signals.

The different combinations of these three digits for controlling the CF staticisor group to provide for different control functions will be discussed in detail later.

A further similar group of three trigger circuit arrangements 286, 287 and 288 forms the TFA staticisor group which deals with digits 14–16 of an instruction word and which govern the manner of transfer from the accumulator. Such trigger devices are supplied respectively with the PI17, PI18 and PI19 signals from the delay chain of Fig. 13 and with the $\overline{32}$-pulse waveform as the inhibiting medium and with a specially manufactured pulse known as the 32′-pulse signal as their initiating medium. These triggers provide respectively the $g$ and $\bar{g}$, the $h$ and $\bar{h}$ and the $j$ and $\bar{j}$ signals. The aforesaid 32′-pulse signal is derived from the normal 32-pulse signal through gate 289 supplied with the 32 pulse and the B and $\overline{pC}$ signals dealt with later and each derived from the beat circuit shown in Fig. 11. Gate 289 provides the requisite 32′-pulse signal. Broadly, the function is that the 32′-pulse signal is supplied only under certain operational conditions determined by the aforesaid B and $\overline{pC}$ signals.

The various combinations of the output signals from this staticisor group TFA necessary to define the different forms of transfer from the accumulator will be dealt with later.

A third or AF group of staticisors comprises three precisely similar trigger arrangements 290, 291 and 292 which are supplied respectively with the PI16, PI17 and PI18 signal outputs from the delay chain, Fig. 13. These trigger arrangements are initiated by a special 34′-pulse signal referred to below and are reset or inhibited by a further special $\overline{33}''$-signal also referred to later. The respective outputs from these three trigger arrangements form the $d$ and $\overline{d}$, $e$ and $\overline{e}$ and the $f$ and $\overline{f}$ signals dependent respectively on the 19th, 18th and 17th digits of the instruction word.

The 34′-pulse signal referred to above is derived through gate 293 supplied with the 34-pulse signal and with the B and $\overline{pC}$ signals already referred to. As in the case of the 32′-pulse signal, the general function is to provide a 34′-pulse signal only under certain operating conditions. The $\overline{33}$″-pulse signal is derived from inverter 300 supplied with the output of mixer 295 whose inputs are derived respectively from gates 296 and 297. Each of these gates is supplied with the 33-pulse signal, gate 296 being controlled also by the $d$ signal from trigger 290 and with the C signal from the beat counter, Fig. 11. Gate 297 is controlled by the aforementioned $\overline{pC}$ signal from the beat counter, Fig. 11, and with the $\overline{d}$ signal from trigger 290. As before this $\overline{33}$″-pulse signal is available in digit time 33 only under certain operating conditions.

The signals from this staticisor group AF determine the function performed by the accumulator in accordance with a code which will be referred to in detail later.

The fourth group of staticisors TTA deals with the digits 17–19 of the instruction word and similarly comprises three trigger arrangements 301, 302 and 303 supplied respectively with the PI13, PI14 and PI15 signals from the delay chain, Fig. 13. Each trigger is initiated in its operation by the 34′-pulse signal already described and is inhibited by the $\overline{32}$-pulse signal also previously described. The respective trigger arrangements provide the $a$ and $\overline{a}$, $b$ and $\overline{b}$ and the $c$ and $\overline{c}$ signals which govern the manner of transfer to the accumulator according to a code which will be dealt with in detail later.

The arithmetical organ (marked 2 in Figure 1) is shown in detail in Figures 10*a*, 10*b*, 10*c* and 10*d*.

The multiplicand register (16 in Figure 1) of this organ is shown at D (Figure 10*c*) and works as follows. The register comprises a delay line 61 which itself produces a delay of 34 units. The contents of this store normally circulate via the amplifier 62, the reshaper 63, the gate 64, the mixer 65 and the driver 66. The contents of this register can be applied back to the accumulator register (9 in Figure 1) as the R3 signal from the shaper 63 which is supplied to the gate 89 at the input gates to the accumulator register shown in Figure 10*b*.

When it is desired to change the contents of this multiplicand register the inputs $\overline{ghi}$ from the TFA group of staticisors, Fig. 14, which are applied to the gate 68 become three ones and the output from the gate 68 opens the gate 70 so that the word on the bus fed by the cathode follower 71 (which is, in fact, one output from the accumulator register known as the ACCO/PI output) flows into the multiplicand register via the mixer 65. At the same time the inverse output (the mix of inputs $g\overline{hi}$ from the same staticisor group available from the mixer 72), applied to the gate 64 fails to open this gate 64 and the word already in the register is eliminated.

The multiplier register (14 in Fig. 1) is shown at R (Fig. 10*d*) and also works in a similar way but in addition it has a controllable shift (15 in Fig. 1) in its circulation.

This shift is controlled as follows: The gates 73 and 74 are opened inversely owing to the action of the inverter 75. Suppose the gate 73 is open, then gate 74 is closed and the circulation of the register is via the gate 73, the mixer 76, the driver 81, the line and preamplifier 82, the amplifier 83, the shaper 84, the unit delay 85, the unit delay 77, the unit delay 78 and thence back to gate 73. The line 82 in this case itself produces a delay of 30 units so that the total delay in the circulation is 33 units and the contents of the register are automatically advanced one unit relative to the rest of the machine in each circulation during which the gate 73 is open.

On the other hand, if the gate 74 is open, then the gate 73 will be closed and the circulation path of the register will then contain gate 79, mixer 80 and the extra unit delay 85*a* and the contents of the store will therefore keep in step with other numbers in the machine.

Figure 10A:
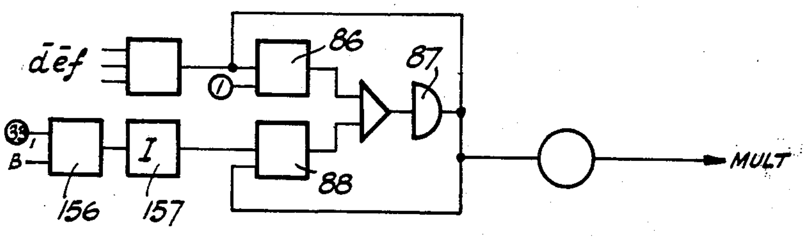

The gates 73 and 74 are controlled inter alia by a "Mult" signal derived from part of the circuit shown in Fig. 10*a*. This part of the circuit constitutes a one-digit staticisor or trigger circuit which gives an output (when activated) which lasts for one word time. This kind of circuit is used throughout the machine and it works as follows: Predetermined inputs $\overline{def}$ (all ones), from the staticisor group AF of Fig. 14, are applied to open the gate 86 when multiplication is required. At digit 1 time a pulse is also applied to the gate 86 and this pulse is delayed one unit at the delay 87 and appears at the input to the gate 88. This gate 88 is conditioned to be opened except at digit 33 time during the presence of a beat signal B (the derivation of which is described later with reference to Fig. 11). Consequently a pulse circulates through gate 88 and delay unit 87 and is available at each subsequent pulse time at the output until after the next following digit 33 time. This output is the multiplier control waveform and is applied to various inputs in the machine labelled "Mult."

Figure 10B:
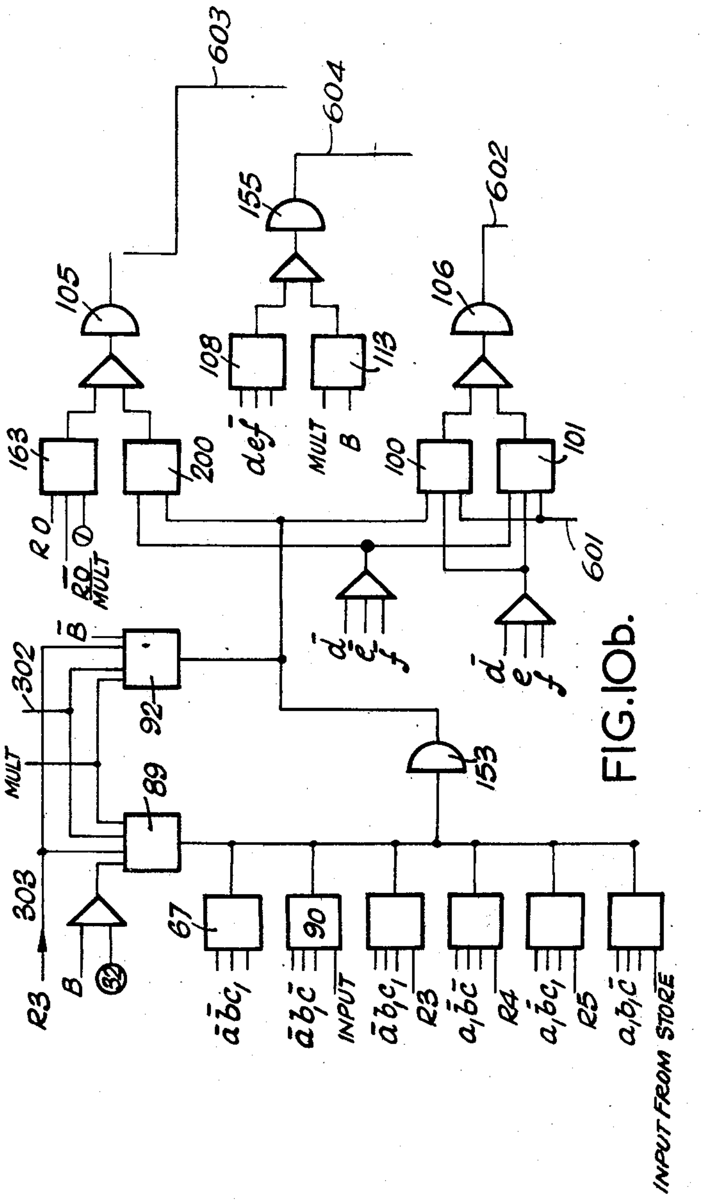
Figure 10C:
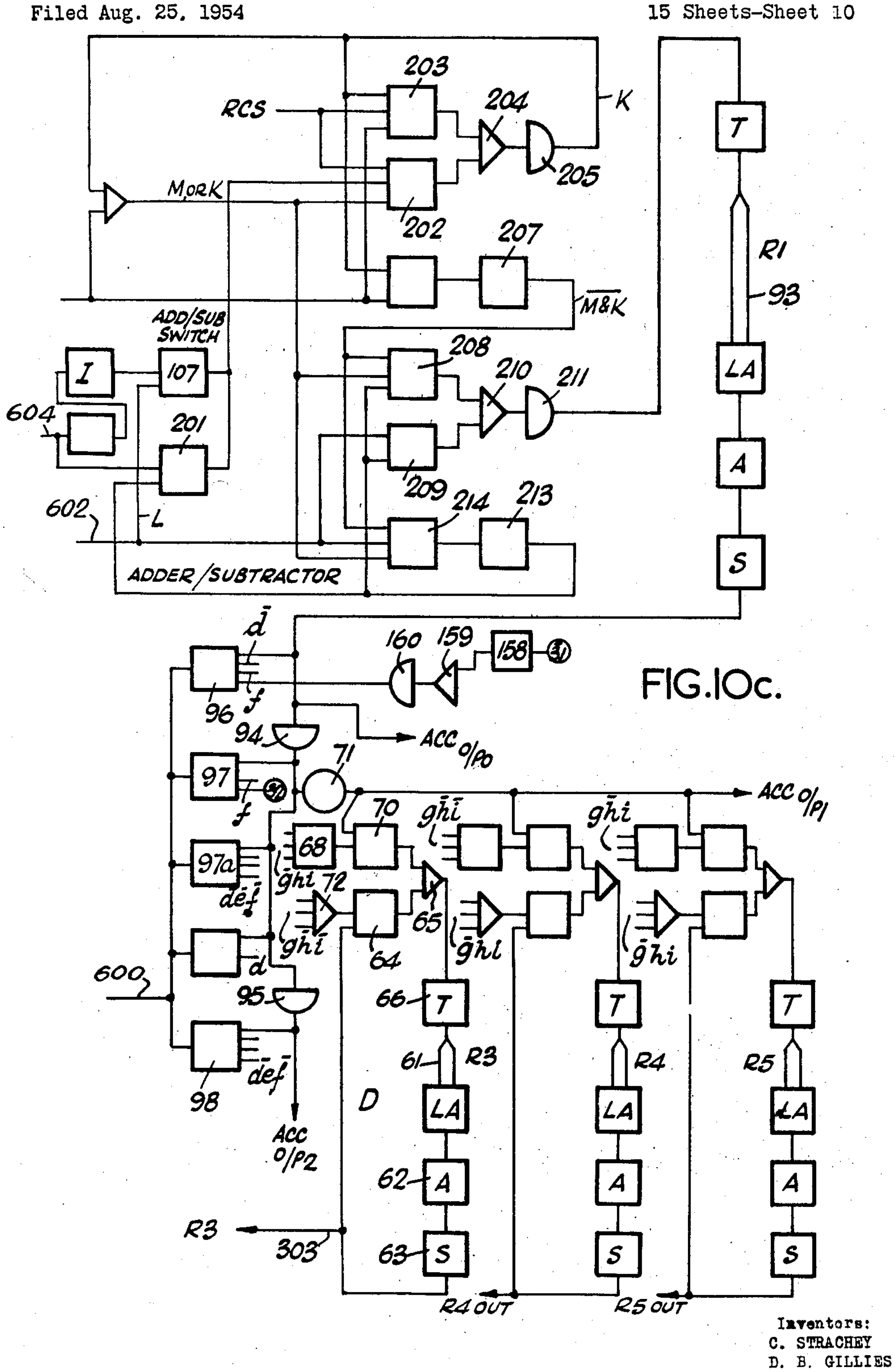
Figure 10D:
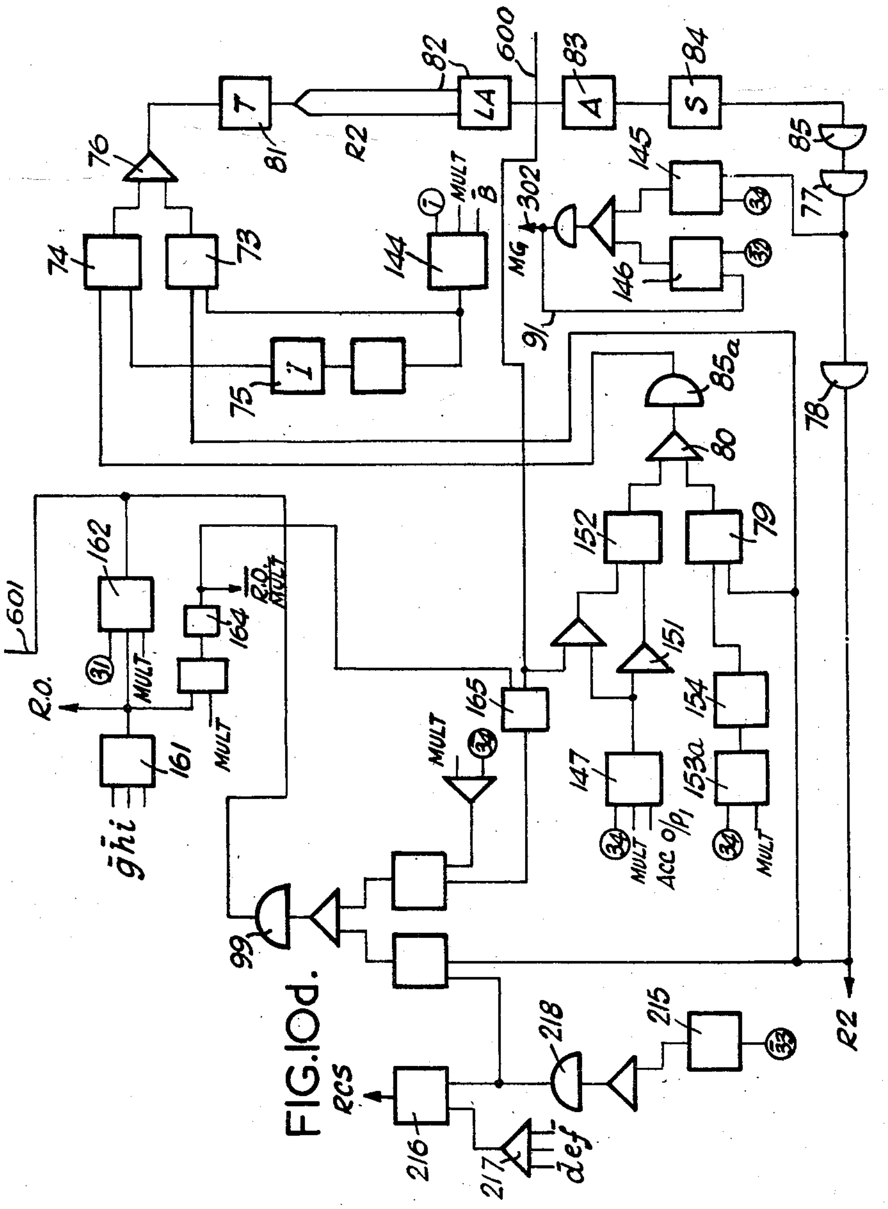

The input $\overline{def}$ is 111 during the whole of the multiplication process and the beat signal is $\overline{B}$, consequently an output is always available from "Mult," the gate 73, Fig. 10*d*, is kept open, gate 74 is shut and the multiplier number signal circulating in the R register is advanced one digit for every word time during the multiplication process. The multiplication process will be discussed in detail below.

The accumulator register (9 in Fig. 1) comprises the delay line 93 (Fig. 10*c*) and its associated amplifiers and gates and has in its circulation the controllable shift (10 in Fig. 1) by means of which none, one or both of the unit delays 94 and 95 are included in the circulation according as the gate 96, 97 (or 97*a*) or 98 respectively is open. Note that during multiplication inputs $\overline{de}$ and $f$ from staticisor groups AF, Fig. 14, are all ones so that the gate 96 is open and the circulation is one unit short of normal. Outputs of various timings can be taken from this accumulator register at the lines marked Acc $0/P_0$, Acc $0/P_1$ and Acc $0/P_2$. The output Acc $0/P_0$ is one unit or digit time early with respect to the standard machine timing, the output Acc $0/P_1$ is identical with the standard machine timing whereas that of Acc $0/P_2$ is one unit or digit time late with respect to the standard machine timing.

The rest of the circulation of the accumulator is by way of lead 600, gate 165 and unit delay 99 (Fig. 10*d*), lead 601 to the accumulator gate 101 and delay 106 (Fig. 10*b*) and thence by way of lead 602 to the unit marked Adder/Substractor (Fig. 10*c*).

This unit gives the sum or difference of numbers coming respectively from the unit delay 105 over lead 603 and from unit delay 106 over lead 602 in accordance with the nature of a control signal fed to the Add/Sub switch, Fig. 10*c*, by way of lead 604 from unit delay 155, Fig. 10*b*.

If addition (as distinct from subtraction) is required, an input $de\overline{f}$ from staticisor group AF, Fig. 14, will not be present at gate 108, Fig. 10*b*, so that the gate 107, Fig. 10*c*, will be open and the gate 201 closed.

As already stated, the adder adds the numbers coming from the delays 105 and 106 by way of leads 603, 602 respectively. The current digits of these numbers will be represented by M and L respectively and the current digit from the delay 205 will be represented by K. This last digit during an addition process is in fact the current carry digit. The digits present on the various lines of the circuit are indicated in the usual notation thus the input of the inverter 207 is M&K and the output from this inverter is "not M&K" represented by $\overline{M\&K}$.

It has been stated that K represents the current carry digit, this is easily seen to be the case if a first entry to the gate 202 is considered. Suppose this entry is one in which $L=1$ and $M=1$, the L digit passes via the gate 107, the M digit is present on the line marked M or K and there will be present an input on the line marked RCS (round carry suppressor), consequently the digit pulse passes the gate 202 and the mixer 204 and after being delayed by the delay 205 will become the current carry pulse at the next entry. This pulse in turn may produce a further carry pulse, e. g. at the gate 203 if the next M is a one and/or at the gate 202 if the next L is a one.

Round carry suppression is provided by exerting an additional control on gates 202 and 203 by means of the signal RCS above mentioned. This signal is derived from gate 216 (Fig. 10*d*) which receives a signal from mixer 217 by virtue of the inputs $\bar{d}e\bar{f}$ from staticisor group AF, Fig. 14, at all times except when the function "not equivalent to" is being operated, and from unit delay circuit 218 at all times except digit 34 time. This latter signal is derived from gate 215, the input to which is $\overline{33}$ i. e. at all times except digit 33 time which becomes digit 34 time at gate 216 after the one digit delay in 218. The signal RCS is therefore present at all times during multiplication except digit 34 time at which time its absence causes gates 202 and 203 to be closed. Gates 202 and 203 being closed at digit 34 time (this is the time of occurrence of digit 32 of the operands because of two unit delays between the store and the adder input) no latent carry can be present in the adder at the time of adding the least significant digits. The least significant digits are present at the input to the adder at pulse 2 time.

The action of the adder is best explained by the scheme given below in which all possible permutations of the current digits LMK are considered and in which the outputs from the elements 214, 213, 208, 209 and 210 are given. The output from the mixer 210 is the important one because this is the final sum. It will readily be seen that the carry digits are produced on the line marked K.

This scheme may readily be checked if the following points are remembered:

(1) The gate 214 yields a one when, and only when, L, M or K and $\overline{M\&K}$ are all ones.

(2) The inverter 213 gives the inverse of the output from 214.

(3) The gate 208 yields a one when, only when, the output from 213, M or K and $\overline{M\&K}$ are all ones.

(4) The gate 209 yields a one when, and only when, the output from 213 and L are both ones.

(5) The output from 210 is a mix of the outputs from 208 and 209.

*Addition*

| Current Digits | | | M & K | $\overline{M \& K}$ | M or K | Output from— | | | | |
|---|---|---|---|---|---|---|---|---|---|---|
| L | M | K | | | | 214 | 213 | 208 | 209 | 210 |
| 0 | 0 | 0 | 0 | 1 | 0 | 0 | 1 | 0 | 0 | 0 |
| 0 | 0 | 1 | 0 | 1 | 1 | 0 | 1 | 1 | 0 | 1 |
| 0 | 1 | 0 | 0 | 1 | 1 | 0 | 1 | 1 | 0 | 1 |
| 0 | 1 | 1 | 1 | 0 | 1 | 0 | 1 | 0 | 0 | 0 |
| 1 | 0 | 0 | 0 | 1 | 0 | 0 | 1 | 0 | 1 | 1 |
| 1 | 0 | 1 | 0 | 1 | 1 | 1 | 0 | 0 | 0 | 0 |
| 1 | 1 | 0 | 0 | 1 | 1 | 1 | 0 | 0 | 0 | 0 |
| 1 | 1 | 1 | 1 | 0 | 1 | 0 | 1 | 0 | 1 | 1 |

It will be seen that the output from the mixer 210 is in fact the required sum. The unit delay 211 is included to make up the proper circulation time of the accumulator register.

The input gates (such as 67, 90, 89, 92, Fig. 10*b*) to the arithmetical organ admit words from various sources to the organ and their purposes will be more conveniently explained when the details of the control unit have been described. The same applies to the input gates to the accumulator register feeding the delays 105 and 106.

If the gate 108, Fig. 10*b*, is opened by the inputs $d\ e\ \bar{f}$, from the staticisor or group AF, Fig. 14, then the gate 107, Fig. 10*c*, is closed and the gate 201 is open and in this case the unit acts as a subtractor. The operation of the circuit in this state will be explained by the following example of subtraction:

```
 1 1 0 0 0 1 1 0
 0 1 1 0 1 1 0 0
 ---------------
 0 1 0 1 1 0 1 0
```

As before, M and L represent the current digits from the delays 105 and 106 respectively and K represents the digit emerging from the delay 205. The following scheme shows the output from the various elements in the circuit when this subtraction is done:

*Subtraction*

| Current Digits | | | M & K | $\overline{M \& K}$ | M or K | Output from— | | | | | | |
|---|---|---|---|---|---|---|---|---|---|---|---|---|
| L | M | K | | | | 214 | 213 | 202 | 204 | 208 | 209 | 210 |
| 0 | 0 | 0 | 0 | 1 | 0 | 0 | 1 | 0 | 0 | 0 | 0 | 0 |
| 1 | 0 | 0 | 0 | 1 | 0 | 0 | 1 | 0 | 0 | 0 | 1 | 1 |
| 1 | 1 | 0 | 0 | 1 | 1 | 1 | 0 | 0 | 0 | 0 | 0 | 0 |
| 0 | 1 | 0 | 0 | 1 | 1 | 0 | 1 | 1 | 1 | 1 | 0 | 1 |
| 0 | 0 | 1 | 0 | 1 | 1 | 0 | 1 | 1 | 1 | 1 | 0 | 1 |
| 0 | 1 | 1 | 1 | 0 | 1 | 0 | 1 | 1 | 1 | 0 | 0 | 0 |
| 1 | 1 | 1 | 1 | 0 | 1 | 0 | 1 | 1 | 1 | 0 | 1 | 1 |
| 1 | 0 | 1 | 0 | 1 | 1 | 1 | 0 | 0 | 0 | 0 | 0 | 0 |

It will be seen from this scheme the subtraction has been chosen so that all possible permutations of the digits L, M and K are considered. The scheme is self-explanatory but it should be noted that the output from the mixer 204 gives the K digit in the next entry. As before, the output from the mixer 210 gives the required result.

It is now necessary to consider the operation of the control unit (3 in Fig. 1) a part of which is shown in Fig. 11.

The various gates in the arithmetical organ have been described as conditioned by various inputs; for example the gate 68 is opened when the inputs $\bar{g}\ h\ i$ are all ones. These inputs are obtained from the various trigger circuits of the staticisor groups shown in Fig. 14 which are set up in accordance with the values (0 or 1) of function digits in the instruction word.

It has already been stated that the control unit looks for coincidence between the address signals coming from the store and one of the address codes in the instruction word, and the order in which the coded addresses are examined depends upon the state of the beat unit the elements of which are shown in Fig. 11.

The output from the delay 225 is the B signal and the output from the inverter 226 is the $\bar{B}$ signal. The beat unit operates as follows:

A signal PI 2 (in digit time 2) derived from the delay chain of Fig. 13 already described is applied to the gate 228 together with the B signal. A signal PI 14 (digit time 14 from the delay chain) is applied to the gate 230 together with the $\bar{B}$ signal. It is easy to confirm by counting that the first address (A1) code in the instruction word appears at PI 2 during digit periods 2 to 8 inclusive, and that the second address (A2) code will appear at PI 14 during the same periods. Suppose the beat unit is in the state in which the B signal is a one, then the output at PI 2 will pass via the mixer 232 and the delay 234 to the gate 236, to which is also applied, via the unit delay 238, the signals coming from the address track of the store (1 in Fig. 1). The outputs from the delays 234 and 238 are mixed and applied to the gate 240 to which is also applied the inverted output from the gate 236. The gate 240 is conditioned to be opened each word time during digit times over the period 3 to 9 inclusive by the trigger 242. Consequently, if a coincidence between the mixed output from the delays 238 and 234, and the output from the inverter 244 is obtained during these periods, the trigger 246 will be set and the delay 248 will give an output. The gate 240 is in fact looking for non-coincidence between one or other of the address codes and the address signal coming from the store and if the circuit is studied carefully, by considering the four possible permutations of 0 and 1 coming from the delays 238 and 234, it will be found that the trigger 246 is put on as soon as any non-coincidence is found between the signal from the address track and the coded address in the instruction word.

Conversely, if non-coincidence is not found, that is to say, if the address signal from the store coincides with the coded address in the instruction word, the trigger 246 will not be set at pulse 34 time at the end of the word in which coincidence was obtained, and the inverter 250 will give a pulse which constitutes the $\overline{pC}$ signal.

We have assumed that the B trigger was in the state in which the B signal was a one. In this state pulses are circulating in the trigger via the gate 254. However, when a $\overline{pC}$ pulse appears at the output of the inverter 250, the B trigger changes its state at the next digit 34 time because a 34 pulse applied to the gate 256 via the gate 258 is applied to the gate 260 and this gives a zero output from inverter 262 and both gates 254 and 256 are closed. The B trigger is then in the other state, i. e. $\bar{B}$ is a one and the circuit looks for coincidence between the address signals from the store and the second address code in the instruction word through the intermediary of gate 230. It will easily be seen that when the B trigger is in the state in which $\bar{B}$ is a one, then the next pulse at $\overline{pC}$ will again change the state of the trigger at digit 34 time after the pulse appears.

The parts of the machine employed for multiplication have been described bit by bit in detail and it is now necessary to take a wider view of the general method of of operation. Before this can be done the form of the order word must be considered in detail.

Digits 1 to 7 are the timing part of the first address signal

Digits 8 to 10 define the track number of the first address

Digits 11 to 13 specify the functions of the control unit according to the following code:

| Digit | | | Trigger output all ones | | | Control Function |
|---|---|---|---|---|---|---|
| 13 | 12 | 11 | | | | |
| 0 | 0 | 0 | $\bar{j}$ | $\bar{k}$ | $\bar{l}$ | Normal action. |
| 0 | 0 | 1 | $\bar{j}$ | $\bar{k}$ | $l$ | Transfer control conditional on the contents of the accumulator being negative. |
| 0 | 1 | 0 | $\bar{j}$ | $k$ | $\bar{l}$ | Transfer control conditional on the contents of the accumulator being zero. |
| 0 | 1 | 1 | $\bar{j}$ | $k$ | $l$ | Obey the order in the Multiplicand Register. |
| 1 | 0 | 0 | $j$ | $\bar{k}$ | $\bar{l}$ | Obey the order in the $R_4$ Register. |
| 1 | 0 | 1 | $j$ | $\bar{k}$ | $l$ | Obey the order in the X Register. |
| 1 | 1 | 0 | $j$ | $k$ | $\bar{l}$ | Work double length. |
| 1 | 1 | 1 | $j$ | $k$ | $l$ | Optional Stop. |

Digits 14 to 16 specify a transfer from the accumulator according to the following code:

| Digit | | | Trigger outputs all ones | | | Transfer from Accumulator |
|---|---|---|---|---|---|---|
| 16 | 15 | 14 | | | | |
| 0 | 0 | 0 | $\bar{g}$ | $\bar{h}$ | $\bar{i}$ | Nowhere. |
| 0 | 0 | 1 | $\bar{g}$ | $\bar{h}$ | $i$ | Round off. |
| 0 | 1 | 0 | $\bar{g}$ | $h$ | $\bar{i}$ | Output. |
| 0 | 1 | 1 | $\bar{g}$ | $h$ | $i$ | Multiplicand register. |
| 1 | 0 | 0 | $g$ | $\bar{h}$ | $\bar{i}$ | Multiplier register. |
| 1 | 0 | 1 | $g$ | $\bar{h}$ | $i$ | X register. |
| 1 | 1 | 0 | $g$ | $h$ | $\bar{i}$ | Store. |
| 1 | 1 | 1 | $g$ | $h$ | $i$ | Track switching. |

Digits 17 to 19 define the accumulator function according to the following code:

| Digit | | | Trigger output all ones | | | Accumulator Function |
|---|---|---|---|---|---|---|
| 19 | 18 | 17 | | | | |
| 0 | 0 | 0 | $\bar{d}$ | $\bar{e}$ | $\bar{f}$ | Add. |
| 0 | 0 | 1 | $\bar{d}$ | $\bar{e}$ | $f$ | Multiply. |
| 0 | 1 | 0 | $\bar{d}$ | $e$ | $\bar{f}$ | Multiply by $2^n$. |
| 0 | 1 | 1 | $\bar{d}$ | $e$ | $f$ | Multiply by $2^{-n}$. |
| 1 | 0 | 0 | $d$ | $\bar{e}$ | $\bar{f}$ | Replace. |
| 1 | 0 | 1 | $d$ | $\bar{e}$ | $f$ | Not equivalent. |
| 1 | 1 | 0 | $d$ | $e$ | $\bar{f}$ | Subtract. |
| 1 | 1 | 1 | $d$ | $e$ | $f$ | Collate. |

Digits 20 to 22 define transfers to the accumulator according to the following code:

| Digit | | | Trigger outputs all ones | | | Transfer from Accumulator |
|---|---|---|---|---|---|---|
| 22 | 21 | 20 | | | | |
| 0 | 0 | 0 | $\bar{a}$ | $\bar{b}$ | $\bar{c}$ | Nowhere. |
| 0 | 0 | 1 | $\bar{a}$ | $\bar{b}$ | $c$ | All ones. |
| 0 | 1 | 0 | $\bar{a}$ | $b$ | $\bar{c}$ | Input (and step-on input reader). |
| 0 | 1 | 1 | $\bar{a}$ | $b$ | $c$ | Multiplicand register. |
| 1 | 0 | 0 | $a$ | $\bar{b}$ | $\bar{c}$ | Multiplier register. |
| 1 | 0 | 1 | $a$ | $\bar{b}$ | $c$ | X register. |
| 1 | 1 | 0 | $a$ | $b$ | $\bar{c}$ | Store. |
| 1 | 1 | 1 | $a$ | $b$ | $c$ | Word generator. |

Digits 23 to 29 form the timing part of the second address. Digits 30 to 32 define the track number of the second address. Finally 33 and 34 form a gap.

Figure 9:
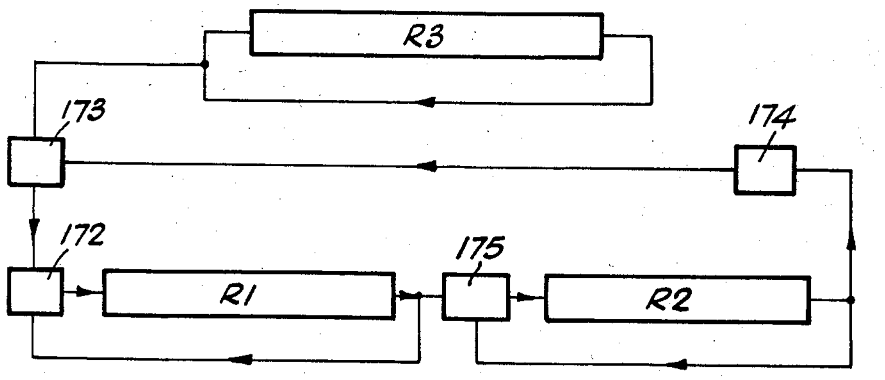
Figure 9 is a block schematic diagram illustrating the arrangement according to the invention employed for multiplication.

Before proceeding to a detailed account of the functioning of the machine when carrying out multiplication it will be convenient to consider the basic principles which will be followed, by reference to Fig. 9 of the drawings which is a block schematic representation of the arrangement. The register $R_1$ is the accumulator register (9 in Fig. 1) which is shown having its own circulating path which includes the adding gate 172. $R_2$ is the multiplier register (14 in Fig. 1), again having its own circulation path. These registers are each arranged, during multiplication, to have a circulation time of 33 digit periods, that is one less than the circulation time of $R_3$ which is the multiplicand register (16 in Fig. 1). $R_3$ is coupled to the adding gate 172 through a multiplying gate which is controlled by a staticisor 174 set up for one word time at a time by an examined 1 digit from the multiplier circulating in register $R_2$. The multiplicand is thus fed into the accumulator register and added to its contents in the appropriate significance for each 1 digit in the multiplier as is well known. At each circulation of the partial product in $R_1$, however, a new digit is produced at the end of higher significance and to accommodate the increase in length of the partial product thus brought about it is arranged for the digit of least significance present in the partial product at each circulation to be passed into the multiplier register $R_2$ through the transfer gate 175. Each digit so transferred will, of course, enter the multiplier register to the left, i. e. at the most significant end, of the digits previously transferred. The transfer gate at the same time prevents the least significant digit of the multiplier (which has just set up the staticisor 174) from re-entering the multiplier register so that this digit, having performed its function is destroyed, and its place made available to be taken by a transferred digit from the partial product in R1. It will thus be seen that the circulation time is one word time for all three registers, an addition takes place at each circulation so that the process takes place at double the normal speed, since normally in multiplication a double length register would have been used requiring two word times for each circulation.

The detailed description of the operation of the machine when multiplying may now be proceeded with.

The multiplier and multiplicand are first routed into the registers $R_2$ and $R_3$, constituted respectively by the register including delay line 82, Fig. 10*d*, and the register including delay line 61, Fig. 10*c*, by the normal processes of the machine and then the multiplication instruction flows into the control register. A typical multiplication instruction word is as follows:

| | A2 | TTA | AF | TFA | CF | | A1 |
|---|---|---|---|---|---|---|---|
| 010 | 1110000 | 000 | 001 | 000 | 000 | 010 | 1010001 |

When the first address has been found the B trigger, Fig. 11, is set into the condition where the $\overline{B}$ signal is on and the machine commences to search for the second address which is arranged by the programme to be 31 word times away in the 1, Fig. 1, so that the machine has 32 word times in which to carry out the multiplication, the last word time overlapping with the reading out of the next instruction.

The adder/subtractor unit of Fig. 10*c* is set for addition (its normal condition) since the input to gate 108, Fig. 10*b*, from staticisor group AF, Fig. 14, is not $d\ e\ \bar{f}$ and the input to gate 113 is not Mult and B (the signal Mult is present but the B trigger is in condition $\overline{B}$). The Mult signal generator (Fig. 10*a*) is set up as described above and is producing Mult signals by virtue of the inputs $d\ \bar{e}\ f$ from the staticisor group AF, Fig. 14, which has been set up by the instruction word.

It follows that the gate 144, Fig. 10*d*, will set the gate 74 open and the gate 74 shut so that the $R_2$ register of delay line 82 will have a circulation time of 33 digits as above described.

On the first circulation the least significant digit will enter the trigger circuit 91 through gate 145 which is opened at digit 34 time and will circulate in this trigger circuit until destroyed by closing of gate 146 by the 32 signal at the next following digit 32 time. The output from this trigger forms the MG signal and is applied over lead 302 to gate 92, Fig. 10*b*, which is controlled also by the Mult signal and the B signal so that if the thus examined least significant multiplier digit is a 1 the gate 92 will be opened and the multiplicand signal $R_3$ output from the $R_3$ register, Fig. 10*c*, will flow by way of lead 303, gate 92, gate 200, unit delay 105 and lead 603 into the adder/subtractor unit, Fig. 10*c*, being added in the process to any existing contents of the accumulator register.

At each circulation in the $R_2$ register, Fig. 10*d*, the multiplier will lose a digit from its least significant end, whereas the partial product in the accumulator register $R_1$, Fig. 10*c*, will grow by one digit, such digit extending the partial product in the direction of lesser significance owing to the short, i. e. 33 unit, circulation time of the $R_1$ register. It is therefore arranged that the least significant digit of the partial product is transferred from the accumulator register $R_1$ into the multiplier register $R_2$ at digit 34 time. This is achieved by gate 147, Fig. 10*d*, which receives digit pulse 34, the Mult signal and the output Acc $0/P_1$ from cathode follower 71, Fig. 10*c*. This digit enters through mixer 151, gate 152, mixer 80, unit delay 85*a*, gate 74 and mixer 76. That this can happen follows since at digit time 1 the gate 144 will close by virtue of the $\bar{1}$ input to it, thereby shutting the gate 73 and opening the gate 74 for just this one digit time. This function coincides with the arrival of the transfer digit by virtue of the unit delay 85*a*.

At the same time the transfer of a digit from the output end to the input end of the delay line 82 of the multiplier register $R_2$ through gate 79 is prevented by the input 34 and Mult to gate 153*a*, which is inverted in inverter 154, and which therefore shuts gate 79.

Obviously, if the multiplier digit staticised in trigger circuit 91, Fig. 10*d*, is a 0, gate 92 will not be opened by the MG signal on lead 302 and the multiplicand will not flow into the accumulator register $R_1$.

It has been pointed out above that the circulation time for the multiplier register $R_2$, Fig. 10*d*, is 33 units, so that the multiplier is shifted to the right by one digit in each circulation. The circulation for the accumulator register $R_1$, Fig. 10*c*, is through gate 96, which is open during multiplication by virtue of the inputs $\bar{d}$ and $f$ from the staticisor group AF, Fig. 14, and the digit pulses entering through gate 158, mixer 159 and delay unit 160, except at digit 32 time at which time the delayed digit 31 fails to open the gate 158, the input to which is $\overline{31}$. Thus, the partial product circulating in the accumulator register will also experience a right shift by one digit in each circulation. The effect of this clearly is for the partial product to extend into the multiplier register R digit by digit as each right shift takes place, and also to procure the necessary relative shift between the partial product and the multiplicand as normally required for the multiplication process.

It is now necessary to examine how the multiplier system takes account of the signs of the multiplier, multiplicand and the partial product. As related above, the sign of a number is indicated by the digit in the position of highest significance. In order that this digit shall not be "lost" as the partial product progresses towards the right it is necessary to copy it one place to the left in each of the numbers representing the partial product and the multiplicand. In the case of the multiplicand this is effected by means of gate 89 (Fig. 10*b*); this gate receives as inputs the output $R_3$ signal over lead 303 from the multiplicand register $R_3$, Fig. 10*c*, the Mult signal, the MG signal output from the trigger 91, Fig. 10*d*, and a fourth signal which is a mix of the signal from beat circuit, Fig. 11, B and digit pulse 32. It follows that on occurrence of digit time 32 (corresponding with the highest significant digit of the multiplicand) gate 89 will open and will pass this digit into the adder/subtractor through unit delay 153. It will thus arrive in the accumulator register one digit late, that is to say, in digit 33 time, which is normally a blank.

The sign digit of the partial product is copied in digit 33 time as follows: As explained above gate 96 (Fig. 10*c*) in the circulation path of the accumulator register is opened except at digit 32 time. At this time the gate 97 will open and the sign digit at time 32 will therefore circulate through the additional unit delay 94. Gate 97 is opened since the input *f* is present and the gate will therefore be opened when digit signal 32 occurs. By virtue of the additional digit delay 99 this signal, of course, becomes digit 33 of the partial product entering the adder/subtractor unit. It is thus ensured that the sign digits are always available at digit 33 time.

In order to take account of the sign digits it is necessary, as has been mentioned in the early parts of this specification, to effect subtraction of the multiplicand instead of addition in the last stage of the multiplication. This is taken care of by arranging that the second address in the multiplication instruction word shall be found as the sign digit of the multiplier sets up the trigger circuit 91. It thus follows that at this instant the machine will change over from searching for a second address to searching for a first address, that is to say, from condition $\overline{B}$ to condition B. This has the effect that gate 113, Fig. 10*b*, experiences the inputs Mult and B, thus passing a signal through delay 155 and lead 604 to change the adder/subtracter from addition to subtraction by reversing gates 107 and 201. When this has happened the Mult signal generator, Fig. 10*a*, is prepared to be shut down by the application of the B signal to gate 156. It is not in fact shut down, however, until the arrival of digit time 33, since one input to gate 156 is digit signal 33. When this happens inverter 157 shuts the gate 88, thus stopping circulation of the multiplication signal Mult which had been circulating through it. Additionally, by the next following digit time 1 the input signal $\overline{d}\,\overline{e}\,f$ will have been broken down by the setting up of a new instruction so that the Mult signal generator will not again be set into operation.

A careful scrutiny will show that during the final word time of the multiplication, the multiplying system has within itself all the information it requires to complete the multiplication. Once the second address has been found, therefore, and the B trigger has reverted to the B condition, the multiplying system can be left to itself and the new instruction word which the second address has found can be read out of the store and staticised in the control unit concurrently with the final stage of the multiplication.

At the completion of multiplication the 32 most significant digits of the product (which includes the sign digit) are circulating in the accumulator register $R_1$, Fig. 10*c*. This circulation will be routed through digit delay 94 and gate **97*a*** in general, so that the number will maintain its normal significance. Simultaneously the least significant part will be circulating in register $R_2$, Fig. 10*d*, through gate 79 and unit delay **85*a* so that it too will preserve its normal significance. By suitable programming procedure the double length number can be used as it stands. If desired, however, the number can be "rounded-off" to a single word-length number, by an order $\overline{g}\,\overline{h}\,i$ which is included in the original multiplication order. This order operates upon the gate 161** (Fig. 10*d*) during the first word time of the multiplication to provide a round-off output at the lead marked RO and also to gate 162 which is opened during multiplication at digit 31 time. A digit is thus added in at digit time 31 and becomes added to the next most significant digit of the first partial product (i. e. next to the sign digit). At the end of the multiplication this becomes the next digit below the least significant digit of the most significant part of the final product and will determine whether or not a digit will be added to the least significant digit in the final product. It will be noticed that the signal on output line RO is also applied to gate 163, Fig. 10*b*. This gate receives a signal at digit time 1 and also an input $\overline{\text{RO and Mult}}$ which it derives from the inverter 164, Fig. 10*d*. This inverter produces an inverted signal in response to the Mult and RO signals which will serve to close gate 163 when the order is "Multiply and Round-off." At other times, when round-off is required, the Mult signal being absent, the input $\overline{\text{RO and Mult}}$ will not close gate 163 so that the round-off signal from output RO is available through delay unit 105 for other functions. The $\overline{\text{RO and Mult}}$ signal is also applied to a gate 165 which is connected in and controls the accumulator register circulation loop. The $\overline{\text{RO and Mult}}$ signal is available only during the first word time of a multiplication and serves to close gate 165 for that time, thus clearing the accumulator register for the commencement of the multiplication. If the order for multiplication includes rounding-off therefore the previous contents of the accumulator will not be added into the product.

The drawings show a number of elements of the machine which are not relevant to the processes of multiplication and which have not, therefore, been described in detail in this specification. The purpose and functioning of these elements can, however, be learned from the prior patent applications referred to above.

We claim:

1. Multiplying apparatus for electronic digital computing machines employing instruction word signals each containing two address signal combinations indicative of the locations of information stored in a storage facility of the machine and in which the machine is invested with one operative condition while searching the storage facility for one of said addresses in an instruction word and with a different operative condition while searching for the other of said addresses, said multiplier including an adding circuit adapted to effect addition of a multiplicand to a partial product in the normal process of multiplication and being adapted to be converted to perform the function of subtraction, wherein means are provided for converting said adding circuit to the function of subtraction on change over of said machine from its one operative condition to its other operative condition.

2. In an electronic digital computing machine adapted to operate in the series mode with numbers whose sign is indicated by the digit signal in the position of highest significance in any number word and employing circulating delay line storage registers, apparatus for carrying out the process of multiplication comprising an accumulator storage register provided with its own circulation loop and having a circulation time shorter than the standard word time by one digit period, a multiplicand register also provided with its own circulation loop and having a circulation time equal to the standard word time, a multiplier register provided with its own circulation loop and having a circulation time which is shorter than the standard word time by one digit period, an adding circuit connected in the circulation loop of said accumulator register, a gate circuit connected between said multiplicand register and said adding circuit, means for controlling said gate circuit, said gate circuit control means comprising a control circuit connected between said multiplier register and said gate circuit, a transfer circuit for transferring digit signals from said accumulator register to said multiplier register and means for taking account of the signs of numbers to be multiplied, said sign-accounting means including means for copying the sign digit signal in the accumulator register into a later digit position on each recirculation of the signal around such register whereby said digit signal is maintained in its proper sign digit position in the accumulator register word despite progress of the other partial product digit signals in such register towards earlier digit positions as the multiplication operation proceeds and means for delaying the sign digit signal of the multiplicand passed through said gate to said adding circuit by one digit time whereby it is maintained in step with the sign digit signal of the partial product signal.

3. In an electronic digital computing machine adapted to operate in the series mode with numbers whose sign is indicated by the digit signal in the position of highest significance in any number word and employing circulating delay line storage registers, apparatus for carrying out the process of multiplication comprising an accumulator storage register provided with its own circulation loop and having a circulation time shorter than the standard word time by one digit period, a multiplicand register also provided with its own circulation loop and having a circulation time equal to the standard word time, a multiplier register provided with its own circulation loop and having a circulation time which is shorter than the standard word time by one digit period, an adding circuit connected in the circulation loop of said accumulator register, a gate circuit connected between said multiplicand register and said adding circuit, means for controlling said gate circuit, said gate circuit control means comprising a control circuit connected between said multiplier register and said gate circuit, a transfer circuit for transferring digit signals from said accumulator register to said multiplier register, means for taking account of the signs of numbers to be multiplied, said sign-accounting means including means for copying the sign digit signal in the accumulator register into a later digit position on each recirculation of the signal around such register whereby said digit signal is maintained in its proper sign digit position in the accumulator register word despite progress of the other partial product digit signals in such register towards earlier digit positions as the multiplication operation proceeds, means for delaying the sign digit signal of the multiplicand passed through said gate to said adding circuit by one digit time whereby it is maintained in step with the sign digit signal of the partial product signal, means for converting said adding circuit from an adding function to a subtracting function and means operative at the final stage of multiplication for causing said conversion to take place in response to a digit signal indicative of negative value of the multiplier, said signal being passed to said control means from said multiplier register.

4. Apparatus as claimed in claim 3 provided in a computing machine organised to employ two address signals in each instruction word, the machine having two states of operation in the first of which the storage facility of the machine is being searched for a first address signalled by the first of said two address signals and in the second of which states said storage facility is being searched for a second address signalled by the second of said two address signals in the instruction word, each of said states giving rise in the machine to a signal characteristic of the respective state, wherein said means for converting said adding circuit from an adding to a subtracting function is connected to receive and is arranged to respond to the signal characteristic of said second state in which the storage facility is being searched for said second address.

5. In an electronic digital computing machine adapted to operate in the series mode with numbers whose sign is indicated by the digit signal in the position of highest significance in any number word and employing circulating delay line storage registers, apparatus for carrying out the process of multiplication comprising an accumulator storage register provided with its own circulation loop and having a circulation time shorter than the standard word time by one digit period, a multiplicand register also provided with its own circulation loop and having a circulation time equal to the standard word time, a multiplier register provided with its own circulation loop and having a circulation time which is shorter than the standard word time by one digit period, an adding circuit connected in the circulation loop of said accumulator register, a gate circuit connected between said multiplicand register and said adding circuit, means for controlling said gate circuit, said gate circuit control means comprising a control circuit connected between said multiplier register and said gate circuit and means for setting up said control circuit in accordance with a digit signal derived from said multiplier register and for causing said control circuit when so set up to maintain said gate circuit operative to supply digit signals representing a multiplicand stored in said multiplicand register to said adding circuit throughout one circulation time of said multiplicand register, a transfer circuit for transferring digit signals from said accumulator register to said multiplier register and means for taking account of the signs of numbers to be multiplied, said sign accounting means including means for copying the sign digit signal in the accumulator register into a later digit position on each recirculation of the signal around such register whereby said digit signal is maintained in its proper sign digit position in the accumulator register word despite progress of the other partial product digit signals in such register towards earlier digit positions as the multiplication operation proceeds and means for delaying the sign digit signal of the multiplicand passed through said gate to said adding circuit by one digit time whereby it is maintained in step with the sign digit signal of the partial product signal.

6. In an electronic digital computing machine adapted to operate in the series mode with numbers whose sign is indicated by the digit signal in the position of highest significance in any number word and employing circulating delay line storage registers, apparatus for carrying out the process of multiplication comprising an accumulator storage register provided with its own circulation loop and having a circulation time shorter than the standard word time by one digit period, a multiplicand register also provided with its own circulation loop and having a circulation time equal to the standard word time, a multiplier register provided with its own circulation loop and having a circulation time which is shorter than the standard word time by one digit period, an adding circuit connected in the circulation loop of said accumulator register, a gate circuit connected between said multiplicand register and said adding circuit, means for controlling said gate circuit, said gate circuit control means comprising a control circuit connected between said multiplier register and said gate circuit and means for setting up said control circuit in accordance with a digit signal derived from said multiplier register and for causing said control circuit when so set up to maintain said gate circuit operative to supply digit signals representing a multiplicand stored in said multiplicand register to said adding circuit throughout one circulation time of said multiplicand register, a transfer circuit for transferring digit signals from said accumulator register to said multiplier register, means for taking account of the signs of numbers to be multiplied, said sign accounting means including means for copying the sign digit signal in the accumulator register into a later digit position on each recirculation of the signal around such register whereby said digit signal is maintained in its proper sign digit position in the accumulator register word despite progress of the other partial product digit signals in such register towards earlier digit positions as the multiplication operation proceeds, means for delaying the sign digit signal of the multiplicand passed through said gate to said adding circuit by one digit time whereby it is maintained in step with the sign digit signal of the partial product signal, means for converting said adding circuit from an adding function to a subtracting function and means operative at the final stage of multiplication for causing said conversion to take place in response to a digit signal indicative of negative value of the multiplier, said signal being passed to said control means from said multiplier register.

7. Apparatus as claimed in claim 6 provided in a computing machine organised to employ two address signals in each instruction word, the machine having two states of operation in the first of which the storage facility of the machine is being searched for a first address signalled by the first of said two address signals and in the second of which said storage facility is being searched for the second address signalled by the second of said two address signals in the instruction word, each of said states giving rise in the machine to a signal characteristic of the respective state, wherein said means for converting said adding circuit from an adding to a subtracting function is connected to receive and is arranged to respond to the signal characteristic of said second state in which the storage facility is being searched for said second address.

8. In an electronic digital computing machine adapted to operate in the series mode with numbers whose sign is indicated by the digit signal in the position of highest significance in any number word and employing circulating delay line storage registers, apparatus for carrying out the process of multiplication comprising an accumulator storage register provided with its own circulation loop and having a circulation time shorter than the standard word time by one digit period, a multiplicand register also provided with its own circulation loop and having a circulation time equal to the standard word time, a multiplier register provided with its own circulation loop and having a circulation time which is shorter than the standard word time by one digit period, an adding circuit connected in the circulation loop of said accumulator register, a gate circuit connected between said multiplicand register and said adding circuit, means for controlling said gate circuit, said gate circuit control means comprising a control circuit connected between said multiplier register and said gate circuit, means for setting up said control circuit in accordance with a digit signal derived from said multiplier register and for causing said control circuit when so set up to maintain said gate circuit operative to supply digit signals representing a multiplicand stored in said multiplicand register to said adding circuit throughout one circulation time of said multiplicand register, means for suppressing the digit of a multiplier stored in said multiplier register at each circulation of said multiplier, after said digit has determined the setting up of said control circuit, a transfer circuit for transferring digit signals from said accumulator register to said multiplier register, said transfer circuit including means for inhibiting the re-entry into said multiplier register of the digit to be suppressed and for transferring in replacement thereof one digit signal from said accumulator register and means for taking account of the signs of numbers to be multiplied, said sign-accounting means including means for copying the sign digit signal in the accumulator register into a later digit position on each recirculation of the signal around such register whereby said digit signal is maintained in its proper sign digit position in the accumulator register word despite progress of the other partial product digit signals in such register towards earlier digit positions as the multiplication operation proceeds and means for delaying the sign digit signal of the multiplicand passed through said gate to said adding circuit by one digit time whereby it is maintained in step with the sign digit signal of the partial product signal.

9. In an electronic digital computing machine adapted to operate in the series mode with numbers whose sign is indicated by the digit signal in the position of highest significance in any number word and employing circulating delay line storage registers, apparatus for carrying out the process of multiplication comprising an accumulator storage register provided with its own circulation loop and having a circulation time shorter than the standard word time by one digit period, a multiplicand register also provided with its own circulation loop and having a circulation time equal to the standard word time, a multiplier register provided with its own circulation loop and having a circulation time which is shorter than the standard word time by one digit period, an adding circuit connected in the circulation loop of said accumulator register, a gate circuit connected between said multiplicand register and said adding circuit, means for controlling said gate circuit, said gate circuit control means comprising a control circuit connected between said multiplier register and said gate circuit, means for setting up said control circuit in accordance with a digit signal derived from said multiplier register and for causing said control circuit when so set up to maintain said gate circuit operative to supply digit signals representing a multiplicand stored in said multiplicand register to said adding circuit throughout one circulation time of said multiplicand register, means for suppressing the digit of a multiplier stored in said multiplier register at each circulation of said multiplier, after said digit has determined the setting up of said control circuit, a transfer circuit for transferring digit signals from said accumulator register to said multiplier register, said transfer circuit including means for inhibiting the re-entry into said multiplier register of the digit to be suppressed and for transferring in replacement thereof one digit signal from said accumulator register, means for taking account of the signs of numbers to be multiplied, said sign-accounting means including means for copying the sign digit signal in the accumulator register into a later digit position on each recirculation of the signal around such register whereby said digit signal is maintained in its proper sign digit position in the accumulator register word despite progress of the other partial product digit signals in such register towards earlier digit positions as the multiplication operation proceeds, means for delaying the sign digit signal of the multiplicand passed through said gate to said adding circuit by one digit time whereby it is maintained in step with the sign digit signal of the partial product signal, means for converting said adding circuit from an adding function to a subtracting function and means operative at the final stage of multiplication for causing said conversion to take place in response to a digit signal indicative of negative value of the multiplier, said signal being passed to said control means from said multiplier register.

10. Apparatus as claimed in claim 9 provided in a computing machine organised to employ two address signals in each instruction word, the machine having two states of operation in the first of which the storage facility of the machine is being searched for a first address signalled by the first of said two address signals and in the second of which states said storage facility is being searched for a second address signalled by the second of said two address signals in the instruction word, each of said states giving rise in the machine to a signal characteristic of the respective state, wherein said means for converting said adding circuit from an adding to a subtracting function is connected to receive and is arranged to respond to the signal characteristic of said second state in which the storage facility is being searched for said second address.

References Cited in the file of this patent

UNITED STATES PATENTS

| | | |
|---|---|---|
| 2,686,632 | Wilkinson | Aug. 17, 1954 |

FOREIGN PATENTS

| | | |
|---|---|---|
| 1,035,453 | France | Apr. 15, 1953 |
| 1,056,750 | France | Oct. 21, 1953 |

OTHER REFERENCES

"A Functional Description of the EDVAC," Moore School of Engineering, University of Pennsylvania, Nov. 1, 1949, vol. I, pages 4–10 to 4–24, vol. II, Figs. 104–3LD–2, 104–3LC–3, total of 16 pages.